United States Patent
Yin et al.

(10) Patent No.: US 12,452,360 B2
(45) Date of Patent: Oct. 21, 2025

(54) SIGNAL PROCESSING METHOD FOR REGULATING INTERFERENCE AND INTERFERENCE IMMUNITY IN TERMINAL DEVICE AND RELATED APPARATUS

(71) Applicant: Honor Device Co., Ltd., Shenzhen (CN)

(72) Inventors: Ming Yin, Shenzhen (CN); Longfei Shi, Shenzhen (CN); Jiaqi Chen, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 14 days.

(21) Appl. No.: 18/010,122

(22) PCT Filed: May 11, 2022

(86) PCT No.: PCT/CN2022/092142
§ 371 (c)(1),
(2) Date: Dec. 13, 2022

(87) PCT Pub. No.: WO2023/015998
PCT Pub. Date: Feb. 16, 2023

(65) Prior Publication Data
US 2024/0244130 A1 Jul. 18, 2024

(30) Foreign Application Priority Data
Aug. 9, 2021 (CN) .......................... 202110906987.3

(51) Int. Cl.
*H04M 1/72454* (2021.01)
*H04B 15/02* (2006.01)
*H04M 1/02* (2006.01)

(52) U.S. Cl.
CPC ........ *H04M 1/72454* (2021.01); *H04B 15/02* (2013.01); *H04M 1/0264* (2013.01)

(58) Field of Classification Search
CPC .......................... H04M 1/72454; H04B 15/02
(Continued)

(56) References Cited

U.S. PATENT DOCUMENTS

2018/0287835 A1* 10/2018 Mishra .................... H03K 5/01
2021/0250104 A1    8/2021 Tang et al.

FOREIGN PATENT DOCUMENTS

| CN | 105827775 A | 8/2016 |
| CN | 108234761 A | 6/2018 |

(Continued)

*Primary Examiner* — Ahmad F. Matar
*Assistant Examiner* — Jirapon Tulop
(74) *Attorney, Agent, or Firm* — Leydig, Voit & Mayer, Ltd.

(57) ABSTRACT

Disclosed is a signal processing method for regulating interference and interference immunity in a terminal device and a related apparatus. A terminal device obtains a state factor used for reflecting a communication state of a communication module and a usage state of a functional module. The terminal device down-regulates the source drive voltage or the source drive current when a frequency division frequency or frequency multiplication frequency of a signal transmitted on the signal line falls within a working frequency range. The terminal device up-regulates the source drive voltage or source drive current when a voltage amplitude of an electromagnetic wave component that is of an electromagnetic wave radiated by the communication module and that is coupled to the signal line is greater than a threshold. In this way, phenomena such as dropped calls and blurry screens can be mitigated, optimizing the user experience.

13 Claims, 8 Drawing Sheets

(58) Field of Classification Search
USPC .......................................................... 455/418
See application file for complete search history.

(56) References Cited

FOREIGN PATENT DOCUMENTS

| | | | | |
|---|---|---|---|---|
| CN | 108365882 | A | 8/2018 | |
| CN | 108900669 | A | 11/2018 | |
| CN | 108964789 | A * | 12/2018 | ........... H04B 15/005 |
| CN | 109067485 | A | 12/2018 | |
| CN | 109412704 | A | 3/2019 | |
| CN | 109547646 | A | 3/2019 | |
| CN | 109889217 | A | 6/2019 | |
| CN | 111783375 | A | 10/2020 | |
| CN | 113810543 | A | 12/2021 | |
| EP | 2562753 | A2 | 2/2013 | |

* cited by examiner

SIGNAL PROCESSING METHOD FOR REGULATING INTERFERENCE AND INTERFERENCE IMMUNITY IN TERMINAL DEVICE AND RELATED APPARATUS

CROSS-REFERENCE TO RELATED APPLICATIONS

This application is a national stage of International Application No. PCT/CN2022/092142, filed on May 11, 2022, which claims priority to Chinese Patent Application No. 202110906987.3, filed on Aug. 9, 2021. The disclosures of both of the aforementioned applications are hereby incorporated by reference in their entireties.

TECHNICAL FIELD

This application relates to the field of terminal technologies, and in particular, to a signal processing method for regulating interference and interference immunity in a terminal device and a related apparatus.

BACKGROUND

With the development of mobile communication technologies, terminal devices are developed in an increasing quantity of ways, and the terminal devices also have an increasing quantity of functions. For example, using an example in which the terminal devices are mobile phones, the mobile phones not only can support call making, but also can support functions such as video viewing and webpage browsing.

However, when calls are made using mobile phones, there are often phenomena such as automatic call interruption, freezing of the display screen, and blurry screens, which affect the normal use of the mobile phones, resulting in poor user experience.

SUMMARY

Embodiments of this application provide a signal processing method for regulating interference and interference immunity in a terminal device and a related apparatus, to regulate a drive voltage or a drive current of a functional module of a terminal device according to a communication state of a communication module, to alleviate phenomena, such as call interruption, freezing screen display, and blurry screens, caused by signal interference and causing the terminal device to fail to run normally.

According to a first aspect, an embodiment of this application provides a signal processing method for regulating interference and interference immunity in a terminal device. The signal processing method includes: obtaining, by a terminal device, a state factor, where the state factor is used for reflecting a communication state of a communication module and a usage state of a functional module in the terminal device, the state factor includes a communication parameter of the communication module and a source drive voltage or source drive current of a signal line corresponding to the functional module, and the communication parameter includes a working frequency range and a transmit parameter of the communication module: down-regulating, by the terminal device, the source drive voltage of the signal line corresponding to the functional module, or down-regulating, by the terminal device, the source drive current of the signal line corresponding to the functional module when a frequency division frequency or frequency multiplication frequency of a signal transmitted on the signal line corresponding to the functional module falls within the working frequency range of the communication module, to reduce interference of the functional module to the communication module; and up-regulating, by the terminal device, the source drive voltage of the signal line corresponding to the functional module, or up-regulating, by the terminal device, the source drive current of the signal line corresponding to the functional module when a voltage amplitude of an electromagnetic wave component that is of an electromagnetic wave radiated by the communication module working in the working frequency range and at the transmit parameter and that is coupled to the signal line corresponding to the functional module is greater than a threshold, to increase interference immunity of the functional module against the communication module.

In this way, the terminal device regulates a drive voltage (source drive voltage) or drive current (source drive voltage) of the signal line corresponding to the functional module according to a communication state of the communication module, to reduce external interference of the functional module or improve an interference immunity capability, to prevent the terminal device from abnormal phenomena such as call interruption, freezing of the display screen, and blurry screens, thereby optimizing user experience.

Optionally, the signal line corresponding to the functional module includes one or more of the following: mobile industry processor interface (MIPI) signal line, an inter-integrated circuit (IIC) signal line, a V-by-One (VBO) signal line, or a low-voltage differential signaling (LVDS) signal line.

Optionally, the working frequency range of the communication module includes one or more of the following: a communication standard, a frequency band, or a channel number. The transmit parameter includes parameters of an antenna state and a transmit power adopted by the terminal device during communication.

Optionally, the functional module includes a camera module and a display module.

Optionally, when a frequency of a MIPI signal line of the camera module is 760 MHz, a communication standard of the communication module is LTE, and a frequency band of the communication module is B8, the terminal device down-regulates a source drive voltage of the MIPI signal line of the camera module to 150 mV, or the terminal device down-regulates a source drive voltage of the MIPI signal line of the camera module to 0.5 mA, to reduce interference of the camera module to the communication module.

In this way, when the frequency of the MIPI signal line of the camera module is 760 MHz, and the communication state is the B8 frequency band under the LTE standard, the terminal device reduces a drive voltage of a MIPI signal of the camera module to 150 mV or a drive current to 0.5 mA, to reduce interference of the camera module to the communication module, thereby optimizing the receiving sensitivity of a radio frequency signal, avoiding reduction of a downlink rate, and improving user experience.

Optionally, when a MIPI signal line of the camera module transmits a signal, a communication standard of the communication module is NR, and a frequency band of the communication module is N78, the terminal device up-regulates a source drive voltage of the MIPI signal line of the camera module to 320 mV, or the terminal device up-regulates a source drive current of the MIPI signal line of the camera module to 1.5 mA, to increase interference immunity of the camera module against the communication module.

In this way, when the communication state is the N78 frequency band under the NR standard, a drive voltage of a MIPI signal of the camera module is increased to 320 mV, or a drive current is increased to 1.5 mA, to enhance interference immunity performance of the MIPI signal of the camera module, thereby improving the interference immunity of the camera module against the communication module and reducing display problems caused by image transmission distortion.

Optionally, when a frequency of a MIPI signal line of the display module is 500 MHz, a communication standard of the communication module is GSM, a frequency band of the communication module is 850, and a channel number of the communication module ranges from 128 to 190, the terminal device down-regulates a source drive voltage of MIPI signal line of the display module to 150 mV, or the terminal device down-regulates a source drive current of the MIPI signal line of the display module to 0.5 mA, to reduce interference of the display module to the communication module.

In this way, when the frequency of the MIPI signal line of the display module is 500 MHz, and the communication state is the channels 128-190 in the 850 frequency band under the GSM standard, the terminal device reduces a drive voltage of a MIPI signal of the display module to 150 mV or a drive current to 0.5 mA, to reduce interference of the display module to the communication module, thereby optimizing the receiving sensitivity of a radio frequency signal, avoiding reduction of a downlink rate, avoiding call interruption, and improving user experience.

Optionally, when a MIPI signal line of the display module transmits an MIPI signal, a communication standard of the communication module is GSM, a frequency band of the communication module is 850, a channel number of the communication module ranges from 191 to 251, the terminal device up-regulates a source drive voltage of the MIPI signal line of the display module to 320 mV, or the terminal device up-regulates a source drive current of the MIPI signal line of the display module to 1.5 mA, to increase interference immunity of the display module against the communication module.

When the communication state is the channels 190-251 in the frequency band of 850 under the GSM standard, the terminal device increase a drive voltage of a MIPI signal of the display module to 320 mV, or a drive current to 1.5 mA, to enhance interference immunity performance of the MIPI signal of the display module, thereby improving the interference immunity of the display module against the communication module, avoiding problems such as blurry screens and freezing display, and improving user experience.

Optionally, the method further includes: obtaining, by the terminal device, a target drive voltage or a target drive current of the signal line corresponding to the functional module from a predetermined correspondence, where the correspondence includes relationships between the target drive voltage or the target drive current, the signal line corresponding to the functional module, and the communication parameter: down-regulating, by the terminal device, the source drive voltage of the signal line corresponding to the functional module to the target drive voltage, or down-regulating, by the terminal device, the source drive current of the signal line corresponding to the functional module to the target drive current when the frequency division frequency or frequency multiplication frequency of the signal transmitted on the signal line corresponding to the functional module falls within the working frequency range of the communication module, to reduce interference of the functional module to the communication module; and up-regulating, by the terminal device, the source drive voltage of the signal line corresponding to the functional module to the target drive voltage, or up-regulating, by the terminal device, the source drive current of the signal line corresponding to the functional module to the target drive current when a voltage amplitude of an electromagnetic wave component that is of an electromagnetic wave radiated by the communication module working in the working frequency range and at the transmit parameter and that is coupled to the signal line corresponding to the functional module is greater than a threshold, to increase interference immunity of the functional module against the communication module.

In this way, the terminal device can regulate a drive voltage or drive current of a functional module according to a predetermined correspondence. The method is simple to implement and easy to operate.

Optionally, the correspondence is included in a state netlist, and the obtaining, by the terminal device, a target drive voltage or a target drive current of the signal line corresponding to the functional module from a predetermined correspondence includes: obtaining, by the terminal device, a target drive voltage or a target drive current of the signal line corresponding to the functional module from the state netlist.

In this way, the terminal device obtains a target drive voltage or a target drive current by querying a state netlist, thereby regulating a drive voltage or drive current of the functional module. The method is simple to implement and easy to operate.

According to a second aspect, an embodiment of this application provides a terminal device. The terminal device may be a mobile phone, a tablet computer, a laptop computer, a personal digital assistant (PDA), a mobile Internet access device (MID), a wearable device, or the like.

The terminal device includes: a processor and a memory. The memory stores computer-executable instructions. The processor executes the computer-executable instructions stored in the memory, to cause the processor to perform the method according to the first aspect.

For beneficial effects of the terminal device provided in the second aspect and all possible designs of the second aspect, refer to beneficial effects brought by the first aspect and all possible structures of the first aspect. Details are not described herein again.

According to a third aspect, an embodiment of this application provides a computer-readable storage medium, storing a computer program or instructions, where the computer program or instructions, when run, implements or implement the method according to the first aspect.

For beneficial effects of the computer-readable storage medium provided in the third aspect and all possible designs of the third aspect, refer to beneficial effects brought by the first aspect and all possible structures of the first aspect. Details are not described herein again.

According to a fourth aspect, an embodiment of this application provides a computer program product, including a computer program or instructions, where the computer program or the instructions, when executed by a processor, implements or implement the method according to the first aspect.

For beneficial effects of the computer program product provided in the fourth aspect and all possible designs of the fourth aspect, refer to beneficial effects brought by the first aspect and all possible structures of the first aspect. Details are not described herein again.

DESCRIPTION OF EMBODIMENTS

Figure 1:
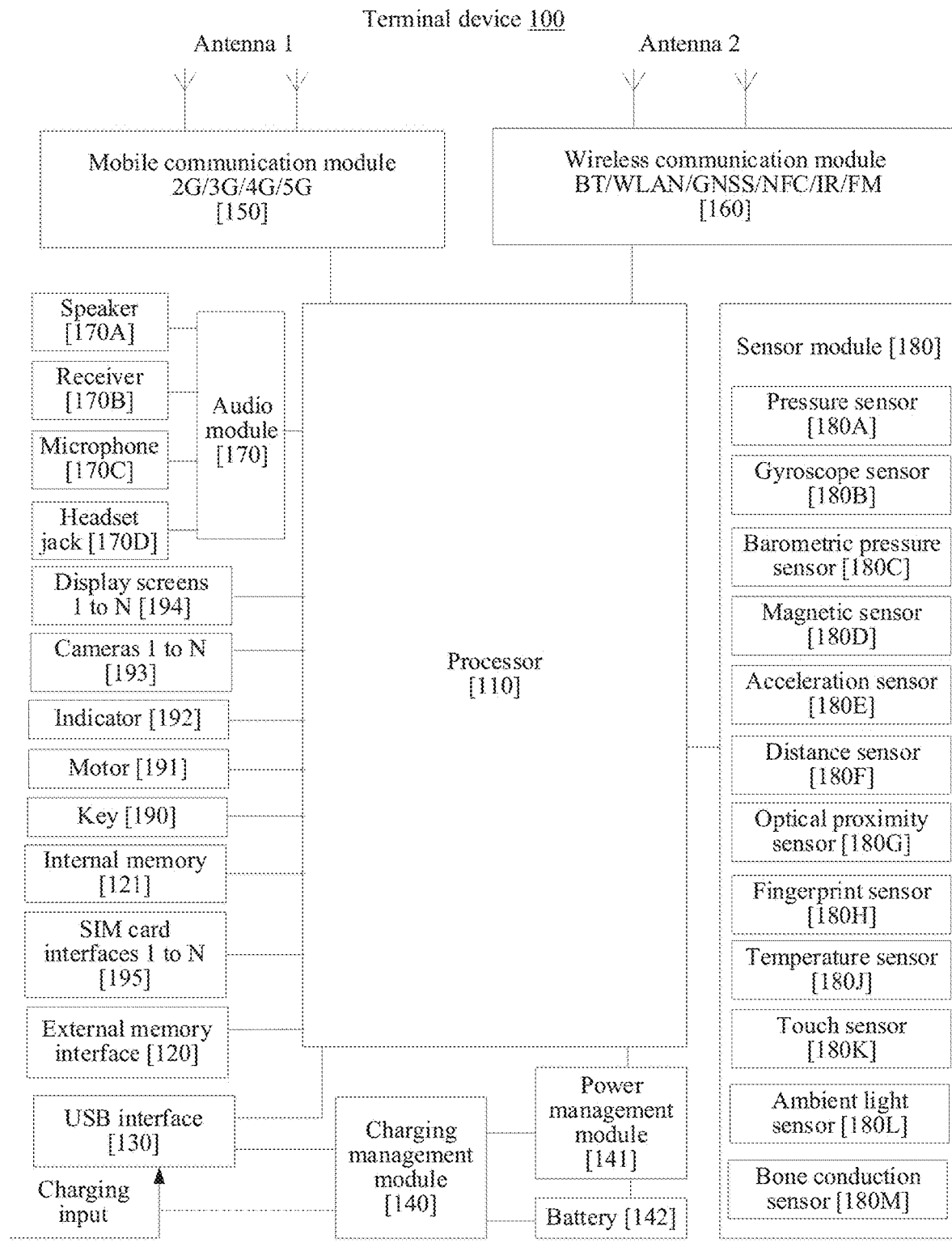
FIG. 1 is a schematic diagram of a hardware structure of a terminal device according to an embodiment of this application.

For ease of describing the technical solutions in the embodiments of this application clearly, in the embodiments of this application, terms, such as "first" and "second", are used to distinguish same or similar items with basically same functions and purposes. For example, a first device and a second device are merely used to distinguish between different devices, and are not intended to limit a sequence thereof. A person of ordinary skill in the art can understand that the terms, such as "first" and "second", do not define a quantity or an execution sequence, and the terms, such as "first" and "second", do not indicate a definite difference.

It should be noted that this application, the term, such as "exemplary" or "for example", is used to represent giving an example, an illustration, or a description. In this application, any embodiment or design scheme described by using "exemplary" or "for example" should not be explained as being more preferred or having more advantages than another embodiment or design scheme. Exactly, use of the term, such as "exemplary" or "for example", is intended to present a related concept in a specific manner.

It should be noted that network architectures and service scenarios described in the embodiments of this application aim to more clearly describe the technical solutions in the embodiments of this application, but are not intended to limit the technical solutions provided in the embodiments of this application. A person of ordinary skill in the art may know that as the network architectures evolve and a new service scenario emerges, the technical solutions provided in the embodiments of this application are further applicable to a similar technical problem.

It may be understood that, the term "more" in this specification refers to two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In a formula, the character "/" indicates a "division" relationship between the associated objects.

It may be understood that, various reference numerals in the embodiments of this application are merely for differentiation for ease of description, and are not intended to limit the scope of the embodiments of this application.

It may be understood that, sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The signal processing method for regulating interference and interference immunity in a terminal device provided in the embodiments of this application can be applied to a terminal device having a display function. The terminal device may also be referred to as a terminal, a user equipment (UE), a mobile station (MS), a mobile terminal (MT), or the like. The terminal device may be a mobile phone, a smart TV, a wearable device, a tablet computer (Pad), a computer having a wireless transmitting and receiving function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

As an example rather than a limitation, in this embodiment of this application, the terminal device may also be a wearable device. The wearable device may also be referred to as a wearable smart device, and is a collective term for wearable devices developed by intelligently designing daily wearing based on a wearable technology, for example, glasses, gloves, a watch, clothing, and shoes. The wearable device is a portable device that is directly worn on a human body or integrated into a user's clothing or accessory. A wearable device is not merely a hardware device, but is used to implement a powerful function through software support, data exchange, and cloud interaction. Generalized wearable smart devices include full-featured and large-size devices that can implement complete or partial functions without depending on smartphones, such as smart watches or smart glasses, and devices that focus on only one type of application and need to work with other devices such as smartphones, for example, various smart bracelets or smart jewelry for monitoring physical signs.

In addition, in the embodiments of this application, the terminal device may also be a terminal device in the Internet of Things (IOT) system. The IoT is an important component of the future development of the information technology, and its main technical feature is connecting things to the network using the communication technologies, so as to implement an intelligent network of human-machine interconnection and interconnection of things.

A specific technology and a specific device form adopted for the terminal device are not limited in the embodiments of this application.

To make embodiments of this application more comprehensible, a structure of the terminal device in the embodiments of this application is described below:

FIG. 1 is a schematic structural diagram of a terminal device 100. The terminal device 100 may include a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in the embodiments of this application constitutes no specific limitation on the terminal device 100. In some other embodiments of this application, the terminal device 100 may include more or fewer components than those shown in the figure, or some components may be combined, or some components may be split, or components are arranged in different manners. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be independent components, or may be integrated into one or more processors.

The controller may generate an operation control signal based on an instruction operation code and a timing signal, and read an instruction and control execution of the instruction.

A memory may be further configured in the processor 110, to store instructions and data. In some embodiments, the memory in the processor 110 is a cache. The memory may store an instruction or data that has just been used or cyclically used by the processor 110. If the processor 110 needs to use the instruction or the data again, the processor may invoke the instruction or the data from the memory, to avoid repeated access, and reduce a waiting time of the processor 110, thereby improving system efficiency.

In some embodiments, the processor 110 may include one or more interfaces. The interface may include an integrated circuit (inter-integrated circuit, or I2C, or IIC) interface, an inter-integrated circuit built-in sound (inter-integrated circuit sound, or I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the terminal device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface can be used for audio communication.

The UART interface is a universal serial data bus used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to peripheral devices such as the display screen 194 and the camera 193. The MIPI interface includes a camera serial interface (CSI), a display serial interface (DSI), and the like. In some embodiments, the processor 110 communicates with the camera 193 by using the CSI interface, to implement a photographing function of the terminal device 100. The processor 110 communicates with the display screen 194 by using a DSI interface, to implement a display function of the terminal device 100.

The GPIO interface may be configured through software. The GPIO interface may either be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, an MIPI interface, or the like.

The USB interface 130 is an interface conforming to a USB standard specification, and may be specifically a Mini USB interface, a Micro USB interface, a USB Type-C interface, or the like. The USB interface 130 may be configured to connect to the charger to charge the terminal device 100, or may be used for data transmission between the terminal device 100 and a peripheral device, or may be connected to a headset to play audio through the headset. The interface may also be configured to connect to another electronic device such as an AR device.

It may be understood that an interface connection relationship between the modules illustrated in the embodiments of this application is merely an illustrative description, and constitutes no limitation on the structure of the terminal device 100. In some other embodiments of this application, the terminal device 100 may also use an interface connection manner different from that in the foregoing embodiment, or use a combination of a plurality of interface connection manners.

The charging management module 140 is configured to receive a charging input from a charger. The charger may be a wireless charger or may be a wired charger. In some embodiments of wired charging, the charging management module 140 may receive a charging input of a wired charger by using the USB interface 130. In some embodiments of wireless charging, the charging management module 140 may receive a wireless charging input by using a wireless charging coil of the terminal device 100. The charging management module 140 may supply power to the terminal device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may be alternatively configured in the processor 110. In some other embodiments, the power management module 141 and the charging management module 140) may further be configured in the same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. An antenna in the terminal device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the terminal device 100. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Next, the demodulator transfers the demodulated low-frequency baseband signal to the baseband processor for processing. The low-frequency baseband signal is processed by the baseband processor and then transferred to an application processor. The application processor outputs a sound signal through an audio device (which is not limited to the speaker 170A, the phone receiver 170B, and the like), or displays an image or a video through the display screen 194. In some embodiments, the modem processor may be an independent device. In some other embodiments, the modem processor may be independent of the processor 110, and the modem processor and the mobile communication module 150 or another functional module may be disposed in the same component.

The wireless communication module 160 may provide a wireless communication solution applicable to the terminal device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components into which at least one communication processing module is integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 of the terminal device 100 are coupled, and the antenna 2 and the wireless communication module 160 of the terminal device 100 are coupled, so that the terminal device 100 can communicate with a network and another device by using a wireless communication technology. The wireless communication technology may include a Global System for Mobile Communications (GSM), a General Packet Radio Service (GPRS), Code Division Multiple Access (CDMA), Wideband Code Division Multiple Access (WCDMA), Time-Division Code Division Multiple Access (TD-SCDMA), Long Term Evolution (LTE), BT, GNSS, WLAN, NFC, FM, and/or IR technologies, and the like. The GNSS may include a Global Positioning System (GPS), a Global Navigation Satellite System (GLONASS), a Beidou Navigation Satellite System (BDS), a Quasi-Zenith Satellite System (QZSS), and/or a Satellite-Based Augmentation System (SBAS).

The terminal device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render graphics. The processor 110 may include one or more GPUs, and execute program instructions to generate or change display information.

The display screen 194 is configured to display an image, display a video, receive a slide operation, and so on. The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the terminal device 100 may include one or N display screens 194. N is a positive integer greater than 1.

The terminal device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may alternatively optimize parameters such as exposure and a color temperature of a photographing scenario. In some embodiments, the ISP may be disposed in the camera 193.

The camera 193 is configured to capture a static image or a video. An optical image of an object is generated through a lens and is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the terminal device 100 may include one or N cameras 193, and N is a positive integer greater than 1.

The digital signal processor is configured to process a digital signal, and may further process another digital signal in addition to a digital image signal. For example, when the terminal device 100 performs frequency selection, the digital signal processor is configured to perform Fourier transform and the like on frequency energy.

The video codec is configured to compress or decompress a digital video. The terminal device 100 may support one or more video codecs. In this way, the terminal device 100 may play or record videos in a plurality of encoding formats, for example, moving picture experts group (MPEG)-1, MPEG-2, MPEG-3, and MPEG-4.

The NPU is a neural-network (NN) computing processor, and quickly processes input information by using a biological neural network structure such as a mode of transmission between human-brain nerve cells, and may further constantly perform self-learning. The NPU may be used to implement an application such as intelligent cognition of the terminal device 100, for example, image recognition, facial recognition, voice recognition, and text understanding.

The external memory interface 120 may be configured to connect to an external storage card, for example, a micro SD card, to expand a storage capability of the terminal device 100. The external storage card communicates with the processor 110 by using the external memory interface 120, to implement a data storage function. For example, a file, such as music or a video, is stored in the external storage card.

The internal memory 121 may be configured to store computer executable program code, and the executable program code includes instructions. The internal memory 121 may include a program storage region and a data storage region. The program storage region may store an operating system, an application required by at least one function (for example, a sound playback function or an image playback function), and the like. The data storage region may store data (for example, audio data and an address book) and the like created when the terminal device 100 is used. In addition, the internal memory 121 may include a high-speed random access memory, or may include a non-volatile memory such as at least one magnetic disk memory, a flash memory, or a universal flash storage (UFS). The processor 110 runs the instructions stored in the internal memory 121 and/or the instructions stored in the memory disposed in the processor, to implement various functional applications and data processing of the terminal device 100.

The terminal device 100 may implement an audio function by using the audio module 170, the speaker 170A, the phone receiver 170B, the microphone 170C, the headset jack 170D, the application processor, and the like, for example, music play back or recording.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The terminal device 100 may be used to listen to music or answer a call in a hands-free mode by using the speaker 170A.

The phone receiver 170B, also referred to as a "receiver", is configured to convert an audio electrical signal into a sound signal. When the terminal device 100 is configured to answer a call or receive voice information, the phone receiver 170B may be put close to a human ear to receive a voice.

The microphone 170C, also referred to as a "mouthpiece" or a "megaphone", is configured to convert a sound signal into an electrical signal. When making a call or sending voice information, a user may make a sound near the microphone 170C through the mouth of the user, to input a sound signal into the microphone 170C. At least one microphone 170C may be disposed in the terminal device 100. In some other embodiments, two microphones 170C may be disposed in the terminal device 100, to acquire a sound signal and implement a noise reduction function. In some other embodiments, three, four, or more microphones 170C may be alternatively disposed in the terminal device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (OMTP)

standard interface, or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The terminal device 100 determines strength of pressure based on a change of the capacitance. When a touch operation is performed on the display screen 194, the terminal device 100 detects strength of the touch operation by using the pressure sensor 180A. The terminal device 100 may further calculate a position of the touch based on a detection signal of the pressure sensor 180A. In some embodiments, touch operations that are performed on a same touch position but have different touch operation strength may correspond to different operation instructions.

The gyroscope sensor 180B may be configured to determine a motion posture of the terminal device 100. In some embodiments, an angular velocity of the head-mounted terminal device 100 around three axes (that is, x, y, and z axes) may be determined through the gyroscope sensor 180B. The gyroscope sensor 180B may be used for image stabilization during photographing. For example, when the shutter is pressed, the gyro sensor 180B detects an angle at which the terminal device 100 jitters, and calculates, based on the angle, a distance for which a lens module needs to compensate, and allows the lens to cancel the jitter of the terminal device 100 through reverse motion, thereby implementing image stabilization. The gyro sensor 180B may also be used in navigation and a motion sensing game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D may include a Hall effect sensor. The terminal device 100 may detect opening and closing of a flip cover or a leather case by using the magnetic sensor 180D. In some embodiments, when the terminal device 100 is a clamshell phone, the terminal device 100 may detect opening and closing of a flip cover according to the magnetic sensor 180D. Further, based on a detected opening or closing state of the leather case or a detected opening or closing state of the flip cover, a feature such as automatic unlocking of the flip cover is set.

The acceleration sensor 180E may detect acceleration values of the terminal device 100 in all directions (generally in three axes). When the terminal device 100 is stationary, a magnitude and a direction of gravity may be detected. The acceleration sensor may be further configured to recognize a posture of the terminal device, and is applied to switching between a landscape screen mode and a portrait screen mode or an application such as a pedometer.

The distance sensor 180F is configured to measure a distance. The terminal device 100 may measure a distance through infrared or laser. In some embodiments, in a photographing scenario, the terminal device 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The terminal device 100 may emit infrared light by using the light-emitting diode. The terminal device 100 detects infrared reflected light from a nearby object by using the photodiode. When detecting sufficient reflected light, the terminal device 100 may determine that there is an object near the terminal device 100. When detecting insufficient reflected light, the terminal device 100 may determine that there is no object near the terminal device 100. The terminal device 100 may detect, by using the optical proximity sensor 180G, that a user holds the terminal device 100 close to an ear for a call, so that automatic screen-off is implemented to achieve power saving. The optical proximity sensor 180G may be further configured to automatically unlock and lock the screen in a leather cover mode and a pocket mode.

The ambient light sensor 180L is configured to sense luminance of ambient light. The terminal device 100 may adaptively adjust a luminance of the display screen 194 according to perceived brightness of the ambient light. The ambient light sensor 180L may be further configured to automatically adjust white balance during photo taking. The ambient light sensor 180L may further cooperate with the optical proximity sensor 180G to detect whether the terminal device 100 is in a pocket, so as to prevent an accidental touch.

The fingerprint sensor 180H is configured to acquire a fingerprint. The terminal device 100 may implement fingerprint unlock, application lock accessing, fingerprint photographing, fingerprint-based call answering, and the like by using a feature of the collected fingerprint.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor near the temperature sensor 180J, to reduce power consumption and implement heat protection. In some other embodiments, when the temperature is lower than another threshold, the terminal device 100 heats the battery 142, to avoid an abnormal shutdown of the terminal device 100 caused by a low temperature. In some other embodiments, when the temperature is lower than still another threshold, the terminal device 100 boosts an output voltage of the battery 142, to avoid an abnormal shutdown caused by a low temperature.

The touch sensor 180K is also referred to as a "touch device". The touch sensor 180K may be disposed on the display screen 194. The touch sensor 180K and the display screen 194 form a touchscreen, which is also referred to as a "touch screen". The touch sensor 180K is configured to detect a touch operation performed on or near the touch sensor 180K. The touch sensor may transfer the detected touch operation to the application processor, to determine a touch event type. The touch sensor 180K may provide a visual output related to the touch operation by using the display screen 194. In some other embodiments, the touch sensor 180K may be alternatively disposed on a surface of the terminal device 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also come into contact with a human pulse to receive a blood pressure pulse signal. In some embodiments, the bone conduction sensor 180M may be alternatively disposed in a headset, to form a bone conduction headset. The audio module 170 may obtain a voice signal through parsing based on the vibration signal, of the vibration bone of the vocal-cord part, that is obtained by the bone conduction sensor 180M, to implement a voice function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or a touch-type key. The terminal device 100 may receive a key input, and generate a key signal input related to user setting and function control of the terminal device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the terminal device 100. The terminal device 100 may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of the same type or different types. The SIM card interface 195 may further be compatible with different types of SIM cards. The SIM card interface 195 may also be compatible with an external memory card. The terminal device 100 interacts with a network by using a SIM card, to implement functions such as a call and data communication. In some embodiments, the terminal device 100 uses an eSIM, that is, an embedded SIM card. The eSIM card may be embedded in the terminal device 100 and cannot be separated from the terminal device 100.

In a process in which a user uses a terminal device, the terminal device may encounter cases such as automatic call interruption, sudden blurring of a display screen, and freezing of display.

Figure 2:
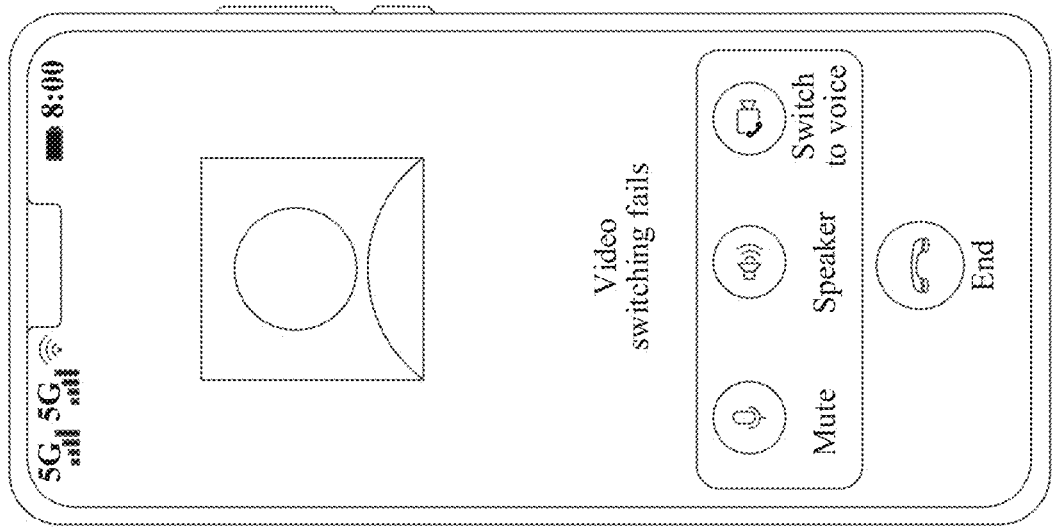
FIG. 2 is a schematic diagram of a call scenario according to an embodiment of this application.
Figure 2:
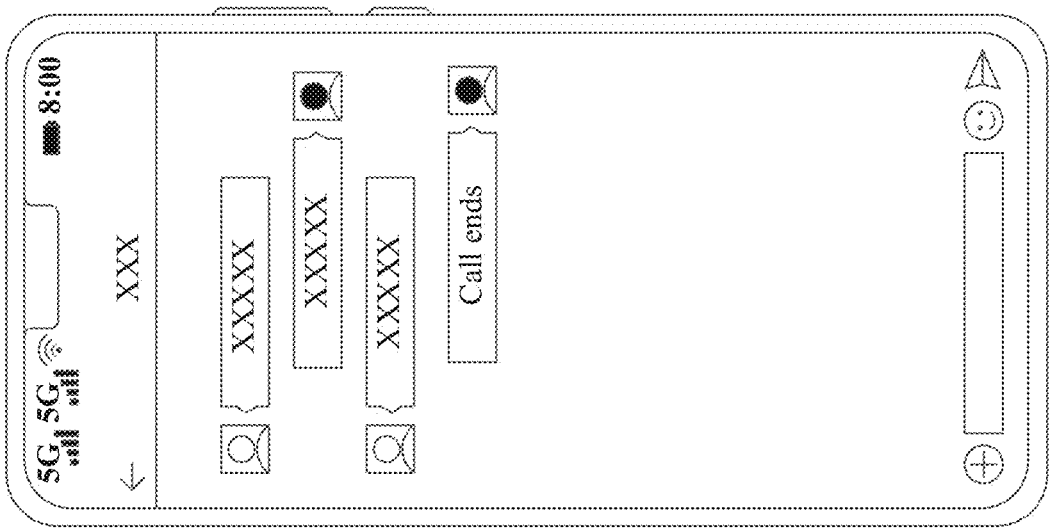
Figure 2:
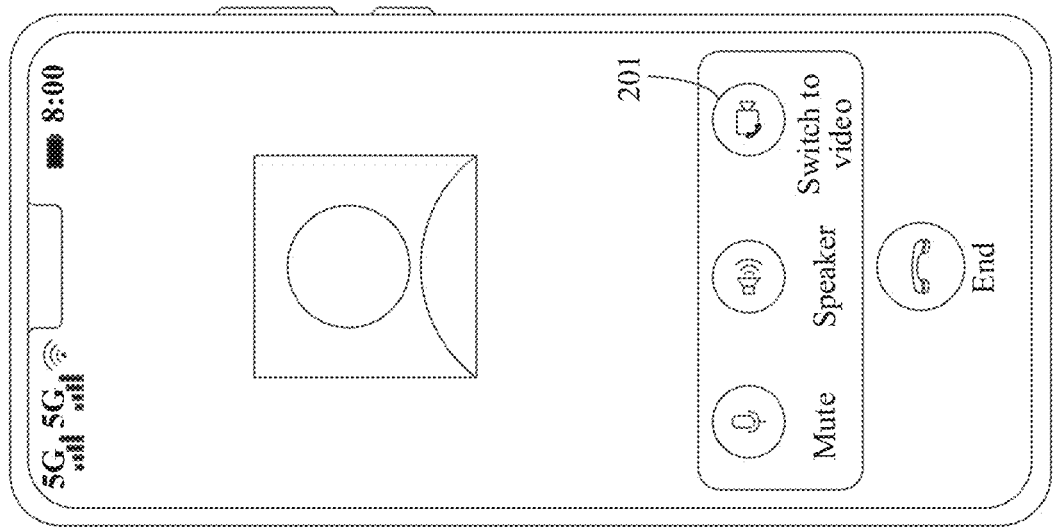

For example, FIG. 2 is a schematic diagram of a call scenario according to an embodiment of this application. When a terminal device receives a trigger operation performed by a user to trigger a Switch to video control 201 in a voice call interface shown in a of FIG. 2, the terminal device may switch to a call end interface shown in b of FIG. 2 or a switching failure interface shown in c of FIG. 2.

In addition, in a scenario of taking a picture or opening a display screen of the terminal device when the terminal device is in a call, when the terminal device controls a camera and/the display screen performs display, the call may be interrupted or disrupted, and the display of the display screen may also be blurred or frozen.

It is generally understood that the reason why the terminal device encounters call interruption is that an antenna of the terminal device is faulty, and the reason why the display screen of the terminal device is blurred or frozen is that the display screen, the camera, or the like is faulty. Alternatively, the foregoing reason is that a software system of the terminal device cannot be run normally. Therefore, when the terminal device fails to operate normally, an adopted means may be restarting the terminal device, or re-installing the software system of the terminal device.

However, the foregoing means sometimes does not work. Upon detection on hardware or software of the terminal device with the foregoing fault, it may be found that the antenna, the display screen, the camera, and the like of the terminal device and the software system of the terminal device are all normal, and there is no fault.

Based on this, in this embodiment of this application, the reason why the terminal device without a hardware or software fault fails to operate and perform display normally is further analyzed, and it is found that the terminal device fails to perform a normal call or display because in some scenarios, the camera module, the display module, the communication module, and the audio module of the terminal device may interfere with each other, resulting in poor stability.

It may be understood that, in the application scenario shown in FIG. 2, when the terminal device switches a voice call to a video call, the communication module may be subject to interference of the camera module, causing the call to end. It is also possible that the camera module is subject to interference of the communication module, and consequently, the camera cannot be opened, resulting in a switching failure.

Figure 3:
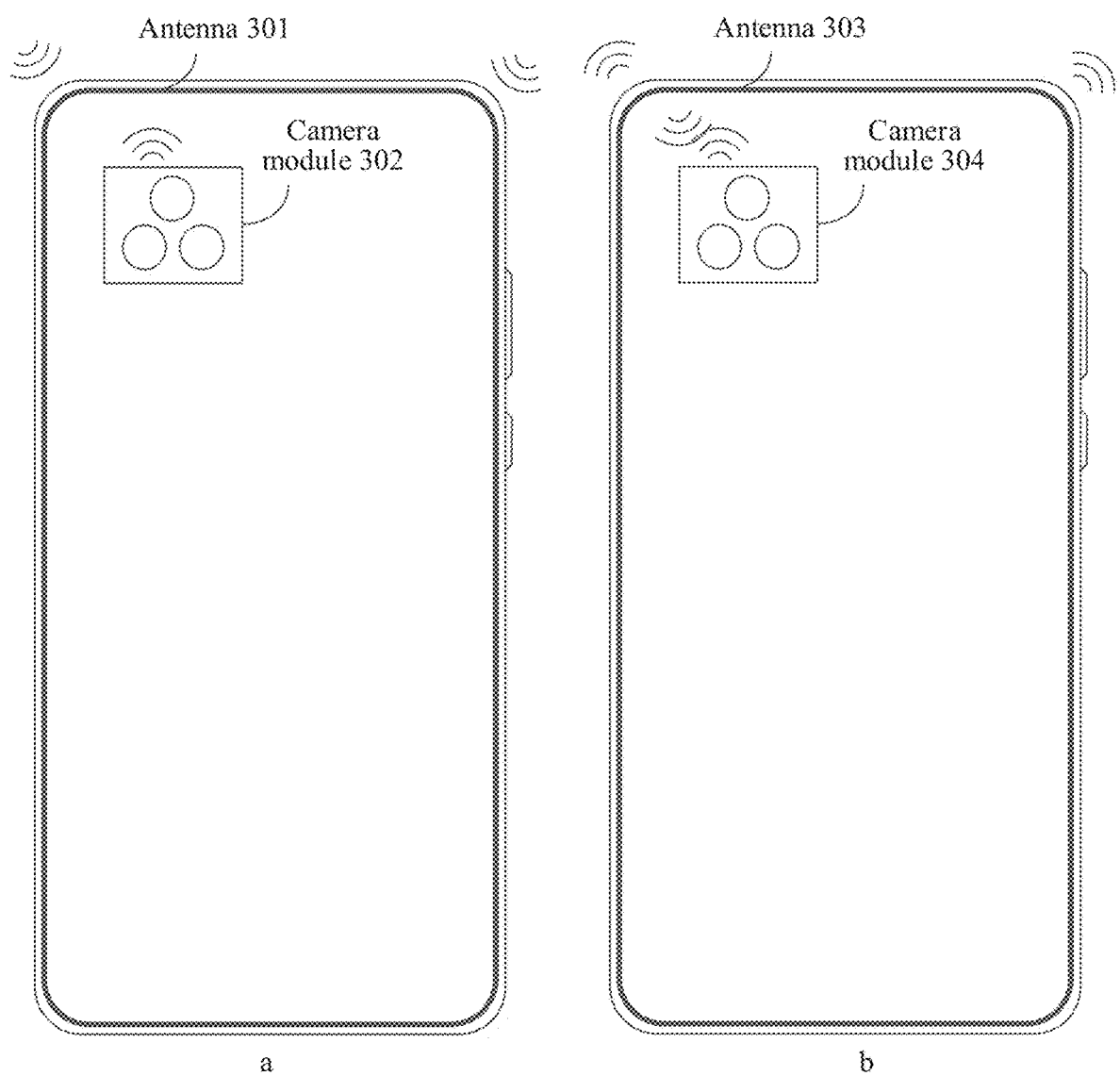
FIG. 3 is a schematic structural diagram of a terminal device according to an embodiment of this application.

FIG. 3 is a schematic diagram of interference between a communication module and a camera module in a possible implementation. As shown in a of FIG. 3, when receiving a radio frequency signal, an antenna 301 in the communication module may be coupled to signal noise in a camera module 302, and is subject to interference, resulting in reduced receiving sensitivity, call interruption, or even a call drop. As shown in b of FIG. 3, when transmitting information, the camera module 304 may be coupled to a radio frequency signal emitted by an antenna 303 in the communication module, and is subject to interference, resulting in distortion of the information transmitted by the camera module. Further, there are cases such as that the camera fails to be opened, that the display screen displays colored strips when displaying an image captured by the camera.

Specifically, the processor of the terminal device includes a plurality of interfaces, and when performing information transmission through signal lines corresponding to the interfaces, the processor may generate high-frequency noise and generate radio frequency interference. The signal lines include a MIPI signal line, an IIC signal line, a V-by-One (VBO) signal line, a low-voltage differential signaling (LVDS) signal line, and the like.

For example, when the terminal device is in a call, the antenna in the communication module may transmit and/or receive a radio frequency signal. When the terminal device lights up the screen, a MIPI signal may be transmitted on the MIPI signal line between the processor and the display screen. During transmission of the MIPI signal, a large quantity of high-frequency noise is generated, resulting in possible interference to signals transmitted by another device or received by the antenna.

Specifically, when the terminal device is in a call with the screen turned off, the antenna in the communication module receive the radio frequency signal without being affected, and the call is normal. When the terminal device responds to the operation of lighting up the screen, the MIPI signal transmitted on the MIPI signal line may interfere with the radio frequency signal received by the antenna, further causing receiving sensitivity of the radio frequency signal to decrease, resulting in call interruption or a call drop.

In addition, when performing information transmission through a signal line corresponding to an interface, the processor may also be subject to interference of a signal transmitted by another device, causing distortion. Consequently, a corresponding device cannot work normally.

For example, when the terminal device is in a call and responds to a photographing operation performed on the camera, the MIPI signal transmitted between the processor and the camera may be subject to interference of a radio frequency signal transmitted by the antenna. As a result, there are errors in the information transmitted between the processor and the camera, an image displayed by the terminal device is distorted or has colored stripes, or even the image cannot be displayed.

For ease of understanding, interference and interference immunity problems in the terminal device are described below with reference to FIG. 4 and FIG. 5.

Figure 4:
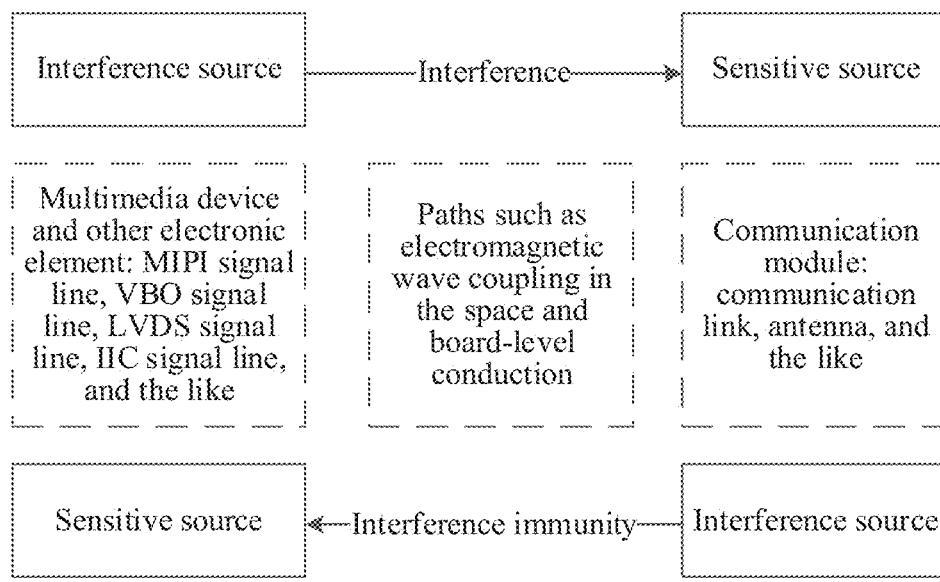
FIG. 4 is a schematic structural diagram of interference and interference immunity phenomena in a terminal device according to an embodiment of this application.

For example, as shown in FIG. 4, a functional module includes a variety of signal lines connected to a multimedia device and other electronic elements. The signal lines include: a MIPI signal line, an IIC signal line, a VBO signal line, an LVDS signal line, and the like. The communication module may include a communication link, an antenna, and the like.

When the multimedia device and other electronic elements in the functional module transmit data through the signal lines, signals transmitted on the signal lines interfere with the communication module through paths such as electromagnetic wave coupling in the space and board-level conduction. When transmitting and receiving radio frequency signals, the communication module may interfere with signals transmitted to the multimedia device and other electronic elements through paths such as electromagnetic wave coupling in the space and board-level conduction.

In FIG. 4, the multimedia device and other electronic elements may interfere with the communication module as interference sources, and may also be subject to interference of the communication module as sensitive sources. The communication module may be subject to interference of the multimedia device and other electronic elements in the functional module as a sensitive source, and may also interfere with the multimedia device and other electronic elements as an interference source.

Figure 5:
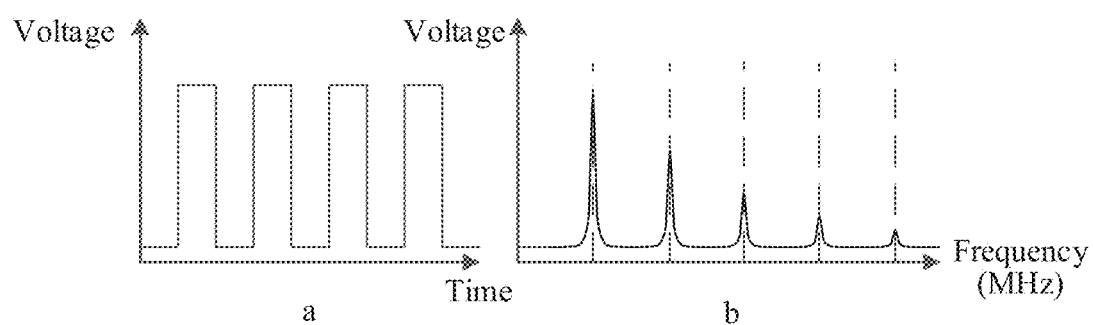
FIG. 5 is a schematic diagram of a waveform of a signal in time domain or frequency domain according to an embodiment of this application.

FIG. 5 is a waveform graph of an interface signal according to an embodiment of this application. As shown in a of FIG. 5, the interface signal behaves as a square wave in time domain. According to the Fourier transform principle, a square wave signal shown in a of FIG. 5 can be regarded as being formed through superposition of a fundamental wave and harmonics of integer frequency multipliers in frequency domain. In addition, the higher the frequency multiplier, the smaller the amplitude of the harmonic, and the smaller the power of the noise. As shown in b of FIG. 5, the fundamental wave has the highest voltage amplitude, and the higher the frequency multiplier, the smaller the amplitude of the harmonic.

It should be noted that when the frequency is relatively low, the power of the harmonic noise is relatively large, which is easy to cause the interference problem; and when the frequency is relatively high, the power of the harmonic noise is relatively small, which is unlikely to cause the interference problem.

Using an example in which the interface signal is a MIPI signal of 400 MHZ, when falling within a communication frequency band of the terminal device, a frequency-multiplied harmonic of the MIPI signal generates interference at a specific frequency, and further interferes with the communication module and affects communication of the communication module, resulting in communication interruption.

It may be understood that, an interference source can also be a sensitive source. Interface signals, such as a MIPI signal and an IIC signal, may be subject to interference of the radio frequency signals in the communication module, resulting in the interference immunity problem.

Specifically, an interface signal, such as a MIPI signal and/or an IIC signal, may be coupled to a radio frequency signal and be subject to interference of the radio frequency signal. In time domain, the interface signal, such as a MIPI signal and/or an IIC signal, behaving as a square wave signal may be superimposed with the radio frequency signal, and an amplitude of the square wave changes, resulting in waveform distortion of the square wave signal. The smaller the amplitude of the square wave signal, the severer the waveform distortion of the square wave signal, and the severer the error of the information transmitted by the interface signal such as a MIPI signal and/or an IIC signal, which may cause the display screen to display a blurry screen, freeze, and so on.

Using an IIC signal as an example, the interference immunity problem is described below with reference to the waveform graphs in FIG. 6 to FIG. 8.

Figure 6:
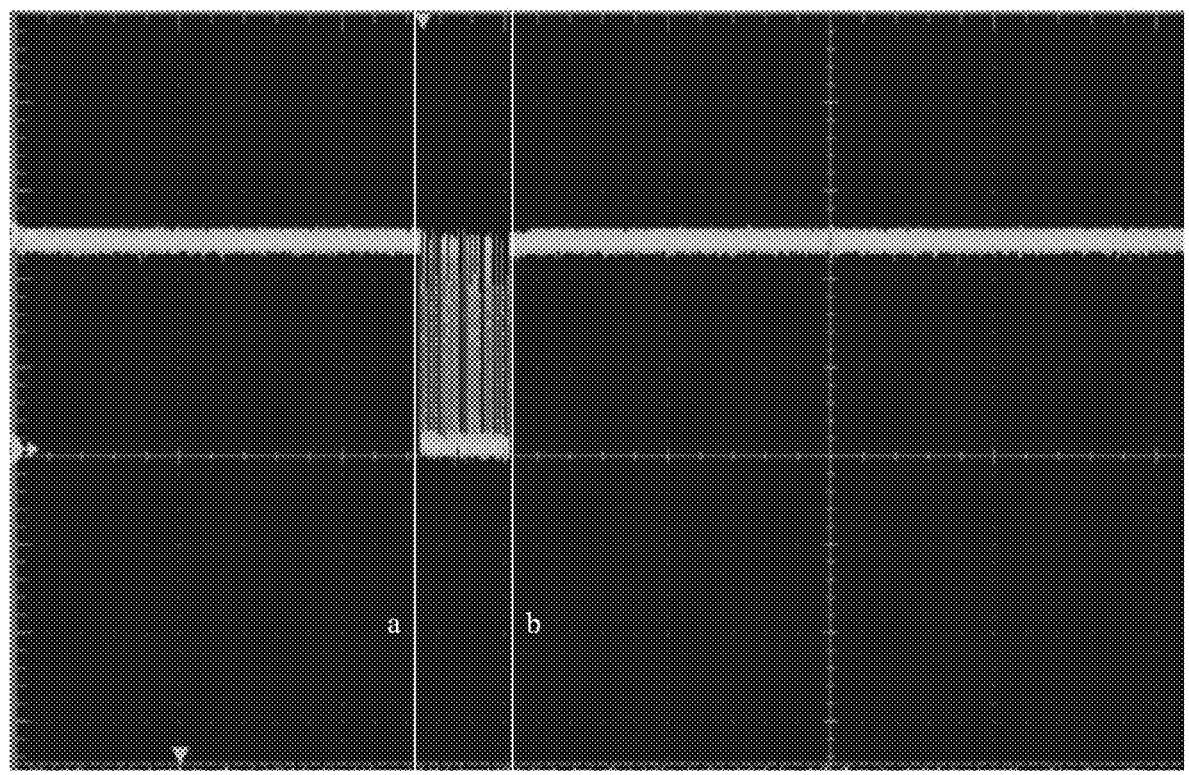
FIG. 6 is a schematic diagram of a test interface according to an embodiment of this application.

For example, FIG. 6 is a schematic diagram of an oscilloscope interface in a possible implementation. As shown in FIG. 6, at a moment a-b, when information is transmitted through an IIC signal on an IIC signal line, a variation amplitude of a level (voltage) in the oscilloscope interface increases, and the IIC signal may be expressed as a high and low level with an amplitude variation of h1. When no information is transmitted on the IIC signal line, there is only a level amplitude variation caused by a normal IIC signal in the oscilloscope interface.

Figure 7:
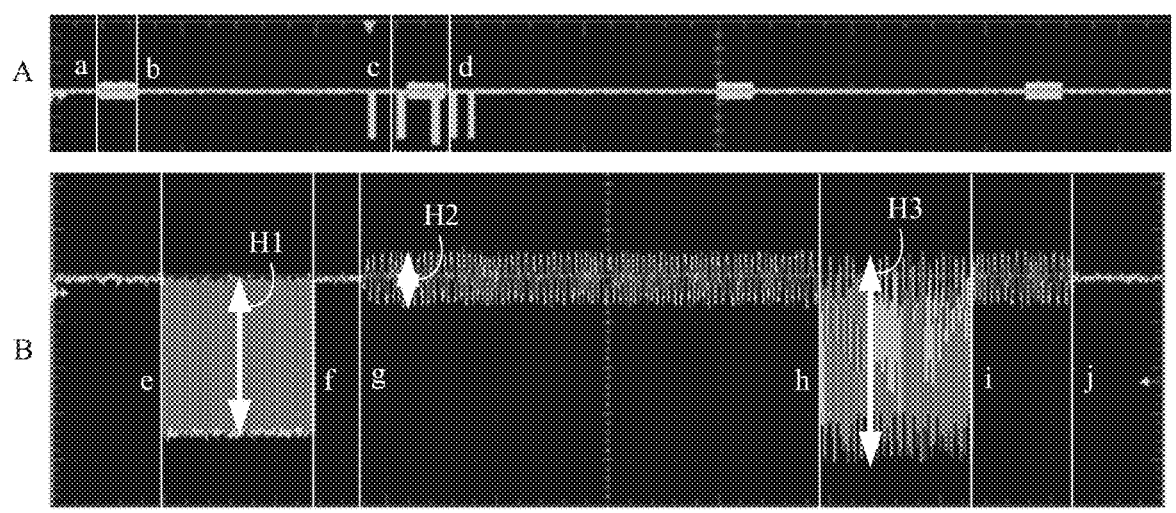
FIG. 7 is a schematic diagram of a test interface according to an embodiment of this application.

FIG. 7 is a schematic waveform diagram of an IIC signal in a possible implementation. As shown in A in FIG. 7, when the terminal device performs communication, a coupled radio frequency signal appears in a waveform graph of the IIC signal. For example, at a moment a-b, the amplitude of the level variation in the oscilloscope interface increases to h1, and the IIC signal line is coupled to a radio frequency signal.

B of FIG. 7 is an enlarged schematic waveform diagram of a moment c-d in A of FIG. 6. As shown in B of FIG. 7, at a moment e-f and a moment h-i, information is transmitted on the IIC signal line, and the amplitude of the level variation in the oscilloscope interface increases. At a moment g-j, the IIC signal line is coupled to a radio frequency signal in the LTE B1 frequency band, and the amplitude of the level variation in the oscilloscope interface increases.

Specifically, at a moment e-f, the IIC signal line transmits information through an IIC signal and is not coupled to a radio frequency signal in the LTE B1 frequency band, and the amplitude of the level variation in the oscilloscope interface is H1. At a moment g-h and a moment i-j, the IIC signal line is coupled to a radio frequency signal in the LTE B1 frequency band and does not transmit information through an IIC signal, and the amplitude of the level variation in the oscilloscope interface is H2. At a moment h-i, the IIC signal line not only transmits information through an IIC signal, but also is coupled to a radio frequency signal in the LTE B1 frequency band, and the amplitude of the level variation of superimposing the coupled radio frequency signal to the IIC signal in the oscilloscope interface is H3. H3 is greater than H1 and H2.

It can be learned from B shown in FIG. 7 that after the IIC signal line is coupled to the radio frequency signal, the transmitted IIC signal changes, resulting in IIC signal distortion.

Figure 8:
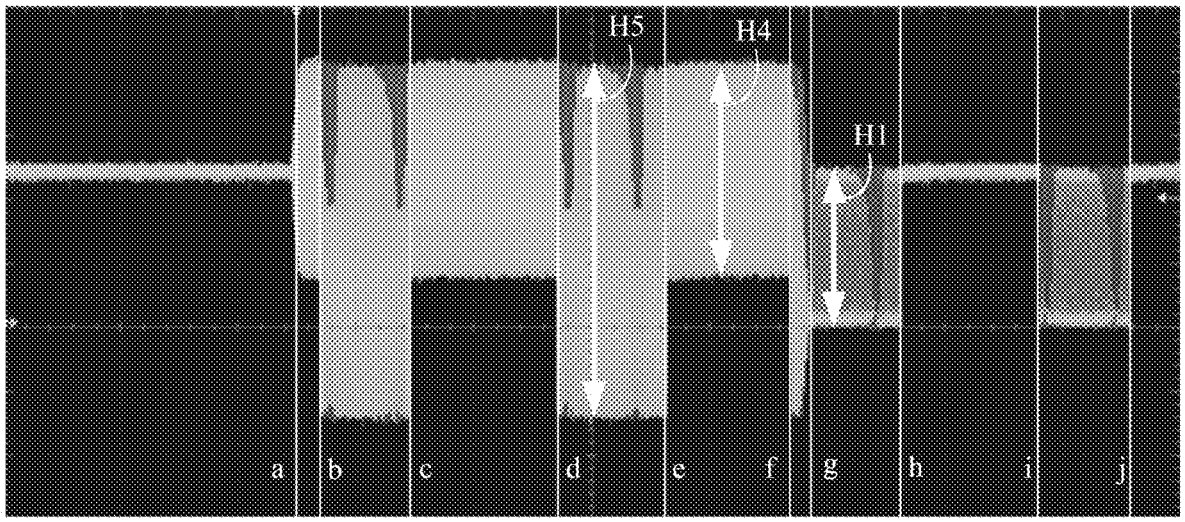
FIG. 8 is a schematic diagram of a test interface according to an embodiment of this application.

FIG. 8 is a schematic waveform diagram of an IIC signal in a possible implementation. As shown in FIG. 8, at a moment b-c, a moment d-e, a moment g-h, and a moment i-j, information is transmitted on the IIC signal line, and the amplitude of the level variation in the oscilloscope interface increases. At a moment a-f, the IIC signal line is coupled to a radio frequency signal in the GSM 1800 frequency band, and the amplitude of the level variation in the oscilloscope interface increases.

Specifically, at a moment g-h and a moment i-j, the IIC signal line transmits information through an IIC signal and is not coupled to a radio frequency signal in the GSM 1800 frequency band, and the amplitude of the level variation in the oscilloscope interface is H1. At a moment a-b, a moment c-d, and a moment e-f, the IIC signal line is coupled to a radio frequency signal in the GSM 1800 frequency band and does not transmit information through an IIC signal, and the amplitude of the level variation in the oscilloscope interface is H4. At a moment b-c and a moment d-e, the IIC signal line not only transmits information through an IIC signal, but also is coupled to a radio frequency signal in the GSM 1800 frequency band, and the amplitude of the level variation of superimposing the coupled radio frequency signal in the GSM 1800 frequency band to the IIC signal in the oscilloscope interface is H5. H5 is greater than H1 and H4.

Compared with the waveform graphs shown in FIG. 7 and FIG. 8, the waveform distortion is severer when the radio frequency signal in the GSM 1800 frequency band is coupled to the IIC signal line. This is because the power of the radio frequency coupled to the IIC signal line is larger.

It should be noted that couplings of the MIPI signal line, the IIC signal line, and the like to radio frequency signals of different frequencies are different, which may be understood as that the MIPI signal line, the IIC signal line, and the like receive radio frequency signals of different frequencies differently. When the terminal device generates or receives a radio frequency signal in a susceptible (strong receiving capability or easy coupling) frequency band, it may cause the distortion of signals such as a MIPI signal and an IIC signal, resulting in the interference immunity problem.

For example, as shown in FIG. 7 and FIG. 8, when the terminal device generates radio frequency signals in the LTE B1 frequency band and the GSM 1800 frequency band, the amplitudes of the radio frequency signals superimposed on the IIC signal are different, and the degrees of distortion of the IIC signal are different. When a radio frequency signal is generated in GSM 1800 frequency band, the level amplitude of the superimposed radio frequency signal is equal to the signal level of the IIC itself, resulting in severe distortion of the IIC signal and generation of interference immunity problem.

This is because when performing communication under different standards, different frequency bands, and different channels, power intensities that are of the power emitted by different products and that are finally coupled to the signal lines such as the IIC signal line and the MIPI signal are also different due to different shapes and layouts of antennas and different layouts and wirings of circuit boards. That is, communication modules of different products in different communication states have different degrees of impact on the IIC and MIPI signal lines. The standard, the frequency band, and the channel number having large impact on the IIC and MIPI signal lines may be expressed as a large level amplitude of a radio frequency signal superimposed on the IIC signal. It may be understood that couplings of the signal line to radio frequency signals of different frequencies are related to the position, the length, and the like of the MIPI signal line. When layouts of a plurality of modules in the terminal device are determined, a position of the multimedia device is determined, and the couplings of the MIPI signal line in the terminal device to the radio frequency signals of different frequencies are determined.

At present, harmonic noise is filtered out by adding a high-frequency filter circuit in the circuit design, and interference performance and interference immunity performance of the MIPI signal are optimized from the hardware level.

However, the improvement from the hardware level increase costs and increase the difficulty of the printed circuit board (PCB) design. In addition, the terminal device requires the hardware to be re-debugged, which prolongs the product development cycle.

It should be noted that noise externally radiated by a signal, such as a MIPI signal, can be expressed in formula as: $P_{noise}=P_{source}*G_{gain}$.

When a drive voltage or drive current of a MIPI signal source falls by 3 dB, a corresponding drive power also falls by 3 dB ($P_{source}$ is reduced by half), and noise finally received by the device also falls by 3 dB ($P_{noise}$ is reduced by half).

In a possible design, due to interference and interference immunity problems of the MIPI signal, when being designed, the drive voltage and the drive current of the MIPI signal are set to median values, so that the MIPI signal neither can achieve the optimal interference performance, nor can achieve the optimal interference immunity performance.

For example, using an example in which a frequency of a MIPI signal of a camera is 760 MHZ, and a drive voltage is designed to be 290 mV, the MIPI signal on the camera device in the terminal device may bring noise with a frequency of 950 MHZ. The noise is radiated outward, eventually interferes with receiving sensitivity of a radio frequency signal of the mobile phone corresponding to the B8 frequency band under the LTE communication standard, and reduces a downlink rate in the LTE B8 frequency band. It should be noted that an uplink frequency range corresponding to B8 is 880 to 915 MHZ, and a downlink frequency range corresponding thereto is 925 to 960 MHZ.

In addition, when the communication module emits a high-power signal in the N78 frequency band under the NR communication standard, the MIPI signal of the camera is subjected to interference of a radio frequency signal corresponding to the NR frequency band, and there is an interference immunity problem. Further, information transferred by the camera is distorted, and there may be colored stripes when the terminal device displays an image. It should be noted that the frequency range corresponding to N78 is 3300 to 3800 MHZ.

For example, using an example in which a frequency of a MIPI signal of a display screen is 500 MHZ, and a drive voltage is designed to be 290 mV, the MIPI signal on the display screen in the terminal device may bring noise with a frequency of 875 MHZ. The noise is radiated outward, eventually interferes with receiving sensitivity of a radio frequency signal of the mobile phone corresponding to a channel 157 in the 850 frequency band under the GSM communication standard, and reduces a downlink rate of the channel 157 in the GSM 850 frequency band. It should be noted that an uplink frequency range corresponding to 850 is 824 to 849 MHz, and a downlink frequency range corresponding thereto is 870 to 894 MHZ.

In addition, when the communication module emits a high-power signal in middle and high channels (channels 190-251) in the 850 frequency band under the GSM communication standard, the MIPI signal of the display screen is subjected to interference of a radio frequency signal corresponding to the middle and high channels (channels 190-251) in the 850 frequency band under the GSM standard, and there is an interference immunity problem. There may be colored stripes when the terminal device displays an image.

In view of this, the embodiments of this application provide a signal processing method for regulating interference and interference immunity in a terminal device. When the terminal device performs communication (for example, making a voice call, making a video call, or performing photographing during a call), various modules (or components) interact with each other, and a drive voltage or a drive current of a signal, such as a MIPI signal, corresponding to an interface is regulated according to a communication frequency used by the terminal device during communication, to reduce the interference of the signal, such as a MIPI signal, or improve the interference immunity performance of the signal such as a MIPI signal.

For example, in a scenario of using a camera to perform photographing during a call, when the terminal device performs communication in the LTE B8 frequency band, a drive voltage of a MIPI signal of a camera is reduced, interference to an LTE B8 signal is reduced, receiving sensitivity of the terminal device is optimized, and the downlink rate reduction problem is resolved. When the terminal device performs communication in the NR N78 frequency band range, the drive voltage of the MIPI signal of the camera is increased, the interference immunity performance of the MIPI signal is improved, and a difference between a level of the MIPI signal and a level of a superimposed radio frequency signal is increased, to avoid distortion of transmitted information, thereby avoiding colored stripes when the terminal device displays the image.

For ease of understanding, some concepts related to the embodiments of this application are exemplified for reference.

1. MIPI is an open standard and a criterion initiated by the MIPI Alliance and formulated for mobile application processors, which standardizes internal interfaces of an electronic device, for example, a display screen interface, a camera interface, and a radio frequency interface. A signal transmitted at a MIPI interface or a data line connected to the MIPI interface is a MIPI signal. The MIPI interface is configured to transmit multimedia information in a multimedia device.

2. Inter-integrated circuit (I2C or IIC) interface is used for transmitting a control signal between a processor, an electronic element, a sensor, or a camera.

3. V-by-One (VBO) is a digital interface standard technology for image information transmission. The VBO interface is connected to a multimedia device such as a display screen and is used for transmitting multimedia information in the multimedia device.

4. Low-voltage differential signaling (LVDS) interface is used for transmitting multimedia information in a multimedia device (a display screen or the like).

5. Receiving sensitivity is a receiving power required for normal operation of a terminal device at a specific bit error rate. It should be noted that the receiving sensitivity is usually expressed as a negative value. When a radio frequency signal is subjected to interference of harmonic noise, an error rate of the radio frequency signal increases, a receiving power required for normal operation of the terminal device increases, receiving sensitivity of the terminal device is lower, and further, network disconnection may occur or a communication rate is affected.

6. Communication standard is a signal transmission standard. The communication standard of the terminal device includes a Global System for Mobile Communications (GSM), Code Division Multiple Access (CDMA), Wideband Code Division Multiple Access (WCDMA), CDMA200, Time-Division Code Division Multiple Access (TD-SCDMA), Long Term Evolution (LTE), New Radio (NR), another evolved communication system, or the like.

7. Frequency band is a frequency range of a radio wave (radio frequency signal). Usually, a frequency band below 1 gigahertz. (GHz) is referred to as a low-frequency frequency band, a frequency band of 1 GHZ to 2.2 GHZ is referred to as an intermediate-frequency frequency band, and a frequency band above 2.3 GHZ is referred to as a high-frequency frequency band. In the LTE communication standard, the low-frequency frequency band includes band5 (B5), B8, B12, B28, and the like, the intermediate-frequency frequency band includes B1, B2, B3, B4, B34, B39, and the like, and the high-frequency frequency band includes B30, B7, B38, B40, and the like. The frequency bands in the NR communication standard include N78, N1, N2, and the like.

8. Channel number is a channel number corresponding to a carrier used for mobile communication. A channel further divides frequencies of the frequency band. For example, Table 1 shows channel ranges corresponding to frequency bands in the GSM communication standard. The GSM communication standard includes 4 frequency bands, namely, GSM 850, GSM 900, GSM 1800, and GSM 1900. GSM 850 includes channels 128-251. GSM 900 includes channels 0-125 & 954-1024. GSM 1800 includes channels 511-886. GSM 1900 includes channels 512-810.

Table 1 shows channel ranges corresponding to frequency bands in the GSM communication standard.

TABLE 1

| Frequency band | Channel range |
|---|---|
| GSM 850 | 128-251 |
| GSM 900 | 0-125 & 954-1024 |
| GSM 1800 | 511-886 |
| GSM 1900 | 512-810 |

The signal processing method for regulating interference and interference immunity in a terminal device provided in the embodiments of this application is described below with reference to FIG. 9 to FIG. 12.

Figure 9:
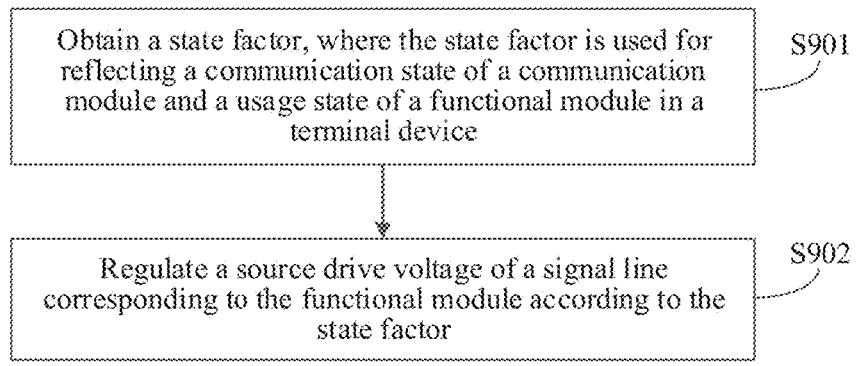
FIG. 9 is a schematic flowchart of a signal processing method according to an embodiment of this application.

FIG. 9 is a schematic flowchart of a signal processing method according to an embodiment of this application. As shown in FIG. 9, the signal processing method includes the following steps.

S901: A terminal device obtains a state factor, where the state factor is used for reflecting a communication state of a communication module and a usage state of a functional module in the terminal device.

Specifically, the state factor includes a communication parameter of the communication module and a source drive voltage or source drive current of a signal line corresponding to the functional module. The communication parameter includes a working frequency range and a transmit parameter of the communication module.

In this embodiment of this application, the communication module is configured to implement communication of the terminal device. For example, the communication module may include a mobile communication module and a wireless communication module.

In this embodiment of this application, the functional module is configured to implement various functions of the terminal device. The various functions, include, but are not limited to, display, photographing, storage, audio playback, and the like. The functional module includes, but is not limited to, a display module, a camera module, an audio module, and the like. In this embodiment of this application, the communication state is used for indicating a situation of current communication. The state factor (a working frequency range and a transmit parameter of the communication module) corresponding to the communication state includes one or more of the following: a standard of a currently registered network, a current frequency band for communication with a base station, a current channel for communication, a current power for communication, or the like. The transmit parameter is used for indicating an antenna state and a transmit power adopted by the terminal device during communication.

It should be noted that in this embodiment of this application, the source drive voltage may also be referred to as a drive voltage.

In this embodiment of this application, a usage state of the functional module is used for indicating of usage of a signal line corresponding to a current functional module. The signal line includes one or more of the following: a MIPI signal line, an IIC signal line, a VBO signal line, an LVDS signal line, or the like.

In this embodiment of this application, the source drive voltage of the signal line is used for indicating a usage state of the functional module. For example, when the terminal device opens a camera to perform photographing during a call, a signal line corresponding to a functional module is a MIPI signal line corresponding to the camera. The obtained state factor includes: a communication standard, a frequency band, a frequency of a MIPI signal line of a camera module (camera), and a drive voltage of a MIPI interface of the camera.

For example, when the terminal device turns on a display screen during a call, a signal line corresponding to a functional module is a MIPI signal line corresponding to the display screen. The obtained state factor includes: a communication standard, a frequency band, a channel number, a frequency of a MIPI, signal line of a display module (display screen), and a drive voltage of the MIPI signal line of the display screen.

S902: The terminal device regulates a source drive voltage of a signal line corresponding to the functional module according to a state factor.

Specifically, the terminal device down-regulates the source drive voltage of the signal line corresponding to the functional module when a frequency division frequency or frequency multiplication frequency of a signal transmitted on the signal line corresponding to the functional module falls within the working frequency range of the communication module, to reduce interference of the functional module to the communication module.

The terminal device up-regulates the source drive voltage of the signal line corresponding to the functional module when a voltage amplitude of an electromagnetic wave component that is of an electromagnetic wave radiated by the communication module working in the working frequency range and at the transmit parameter and that is coupled to the signal line corresponding to the functional module is greater than a threshold, to increase interference immunity of the functional module against the communication module.

It may be understood that when the frequency division frequency or frequency multiplication frequency of the signal transmitted on the signal line corresponding to the functional module falls within a frequency range corresponding to a communication standard, a frequency band, and/or a channel number, a drive voltage (source drive voltage) of the signal line is reduced, a power of the signal is reduced, and noise generated by the signal is reduced, thereby reducing interference to the mobile communication.

When a voltage amplitude of an electromagnetic wave component that is of an electromagnetic wave radiated by a radio frequency signal corresponding to the communication standard, the frequency band, and/or the channel number of the terminal device and that is coupled to the signal line corresponding to the functional module is relatively large, a drive voltage (source drive voltage) of the signal line is increased, and a power of the signal is increased, thereby improving interference immunity against the communication module.

For example, using a MIPI signal line as an example, when the frequency division frequency or frequency multiplication frequency of the MIPI signal falls within a frequency range corresponding to a communication standard, a frequency band, and/or a channel number, a drive voltage of the MIPI signal is reduced. When a coupling of a radio frequency signal corresponding to the communication standard, the frequency band, and/or the channel number of the terminal device to the MIPI signal line is relatively large (a coupled voltage amplitude is relatively large), a drive voltage of the MIPI signal is increased.

It should be noted that for different products, couplings of the radio frequency signal can be obtained through means such as electromagnetic simulation of the whole machine and measurement of interference immunity performance of the whole machine. A driving capability of the IIC or MIPI signal line is correspondingly up-regulated, to increase a difference between a level of the IIC or MIPI signal and a level of the superimposed radio frequency signal, to avoid signal distortion, thereby reducing the interference immunity risk.

It should be noted that the terminal device may perform frequency division processing on the frequency of the MIPI signal according to a specific ratio. For example, the specific ratio may be ¼ or ¹⁄₁₂.

In a possible implementation 1, when the terminal device opens a camera to perform photographing during a call, a detected communication state is a B8 frequency band under the LTE communication standard. The usage state of the signal line corresponding to the functional module is a MIPI signal line of a camera module, where a frequency of the IMPI signal line is 760 MHz and a drive voltage thereof is a 290 mV. The terminal device down-regulates (reduces, for example, to 150 mV) the drive voltage of the MIPI signal line of the camera. In this way, the drive voltage of the MIPI signal line of the camera module is reduced, to reduce interference of the MIPI signal of the camera module to the radio frequency signal of the terminal device, optimize receiving sensitivity of the radio frequency signal, avoid downlink rate reduction, and reduce abnormal cases such as call interruption, thereby optimizing user experience.

In a possible implementation 2, when the terminal device opens a camera to perform photographing during a call, a detected communication state is an N78 frequency band under the NR communication standard. The usage state of the signal line corresponding to the functional module is a MIPI signal line of a camera module, where a drive voltage thereof is a 290 mV. The terminal device up-regulates (increases, for example, to 320 mV) the drive voltage of the MIPI signal of the camera. In this way, a drive voltage of a MIPI signal line of the camera module is increased, to enhance interference immunity performance of the MIPI signal line of the camera module, thereby reducing display problems caused by image transmission distortion.

In a possible implementation 3, when the terminal device turns on a display screen during a call, a detected communication state is channels 128-190 of an 850 frequency band under the GSM communication standard. The usage state of the signal line corresponding to the functional module is a MIPI signal line of a display module, where a frequency of the IMPI signal line is 500 MHz and a drive voltage thereof is a 290 mV. The drive voltage of the MIPI signal line of the display module is down-regulated (reduced, for example, to 150 mV). In this way, the drive voltage of the MIPI signal of the display module is reduced, to reduce interference of the MIPI signal of the display module to the radio frequency signal of the terminal device, optimize receiving sensitivity of the radio frequency signal, reduce a downlink rate reduction, and reduce abnormal phenomena such as call interruption, thereby improving user experience.

In a possible implementation 4, when the terminal device turns on a display screen during a call, a detected communication state is middle and high channels (channels 190-251) of an 850 frequency band under the GSM communication standard. The usage state of the signal line corresponding to the functional module is a MIPI signal line of a display module, where a drive voltage thereof is a 290 mV. The drive voltage of the MIPI signal of the display screen is up-regulated (increased, for example, to 320 mV). In this way, a drive voltage of a MIPI signal of the display module is increased, to enhance interference immunity performance of the MIPI signal of the display module, thereby reducing display problems, such as displaying of blurry screens and freezing of display, when the display screen is turned on, thereby improving user experience.

An uplink frequency range corresponding to the GSM 850 frequency band is 824 to 849 MHZ, and a downlink frequency range corresponding thereto is 869 to 894 MHZ.

In conclusion, in this embodiment of this application, a drive voltage of a signal line corresponding to a functional module is regulated according to communication state, thereby optimizing the interference immunity and interference performance.

Figure 10:
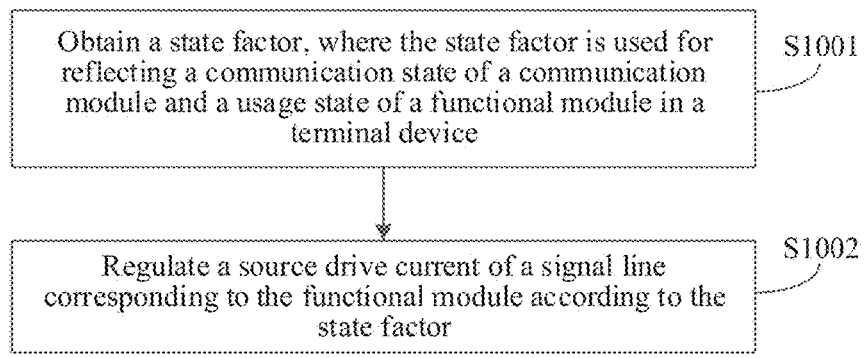
FIG. 10 is a schematic flowchart of a signal processing method according to an embodiment of this application.

FIG. 10 is a schematic flowchart of a signal processing method according to an embodiment of this application. As shown in FIG. 10, the signal processing method includes the following steps.

S1001: A terminal device obtains a state factor, where the state factor is used for reflecting a communication state of a communication module and a usage state of a functional module in the terminal device.

Specifically, the state factor includes a communication parameter of the communication module and a source drive voltage or source drive current of a signal line corresponding to the functional module. The communication parameter includes a working frequency range and a transmit parameter of the communication module.

In this embodiment of this application, the communication module is configured to implement communication of the terminal device. For example, the communication module may include a mobile communication module and a wireless communication module.

In this embodiment of this application, the functional module is configured to implement various functions of the terminal device. The various functions, include, but are not limited to, display, photographing, storage, audio playback, and the like. The functional module includes, but is not limited to, a display module, a camera module, an audio module, and the like. In this embodiment of this application, the communication state is used for indicating a situation of current communication.

The state factor (a working frequency range and a transmit parameter of the communication module) corresponding to the communication state includes one or more of the following: a standard of a currently registered network, a current frequency band for communication with a base station, a current channel for communication, a current power for communication, or the like. The transmit parameter is used for indicating an antenna state and a transmit power adopted by the terminal device during communication.

It should be noted that in this embodiment of this application, the source drive current may also be referred to as a drive current.

In this embodiment of this application, a usage state of the functional module is used for indicating of usage of a signal line corresponding to a current functional module. The signal line includes one or more of the following: a MIPI signal line, an IIC signal line, a VBO signal line, an LVDS signal line, or the like.

In this embodiment of this application, the source drive current of the signal line is used for indicating a usage state of the functional module. For example, when the terminal device opens a camera to perform photographing during a call, a signal line corresponding to a functional module is a MIPI signal line corresponding to the camera. The obtained state factor includes: a communication standard, a frequency band, a frequency of a MIPI signal line of a camera module (camera), and a drive current of a MIPI interface of the camera.

For example, when the terminal device turns on a display screen during a call, a signal line corresponding to a functional module is a MIPI signal line corresponding to the display screen. The obtained state factor includes: a communication standard, a frequency band, a channel number, a frequency of a MIPI signal line of a display module (display screen), and a drive current of the MIPI signal line of the display screen.

S1002: The terminal device regulates a source drive current of a signal line corresponding to the functional module according to a state factor.

Specifically, the terminal device down-regulates the source drive current of the signal line corresponding to the functional module when a frequency division frequency or frequency multiplication frequency of a signal transmitted on the signal line corresponding to the functional module falls within the working frequency range of the communication module, to reduce interference of the functional module to the communication module.

The terminal device up-regulates the source drive current of the signal line corresponding to the functional module when a voltage amplitude of an electromagnetic wave component that is of an electromagnetic wave radiated by the communication module working in the working frequency range and at the transmit parameter and that is coupled to the signal line corresponding to the functional module is greater than a threshold, to increase interference immunity of the functional module against the communication module.

It may be understood that when the frequency division frequency or frequency multiplication frequency of the signal transmitted on the signal line corresponding to the functional module falls within a frequency range corresponding to a communication standard, a frequency band, and/or a channel number, a drive current (source drive current) of the signal line is reduced, a power of the signal is reduced, and noise generated by the signal is reduced, thereby reducing interference to the mobile communication.

When a voltage amplitude of an electromagnetic wave component that is of an electromagnetic wave radiated by a radio frequency signal corresponding to the communication standard, the frequency band, and/or the channel number of the terminal device and that is coupled to the signal line corresponding to the functional module is relatively large, a drive current (source drive current) of the signal line is increased, and a power of the signal is increased, thereby improving interference immunity against the communication module.

For example, using a MIPI signal line as an example, when the frequency division frequency or frequency multiplication frequency of the MIPI signal falls within a frequency range corresponding to a communication standard, a frequency band, and/or a channel number, a drive current of the MIPI signal is reduced. When a coupling of a radio frequency signal corresponding to the communication standard, the frequency band, and/or the channel number of the terminal device to the MIPI signal line is relatively large (a coupled voltage amplitude is relatively large), a drive current of the MIPI signal is increased.

It should be noted that for different products, couplings of the radio frequency signal can be obtained through means such as electromagnetic simulation of the whole machine and measurement of interference immunity performance of the whole machine. A driving capability of the IIC or MIPI signal line is correspondingly up-regulated, to increase a difference between a level of the IIC or MIPI signal and a level of the superimposed radio frequency signal, to avoid signal distortion, thereby reducing the interference immunity risk.

It should be noted that the terminal device may perform frequency division processing on the frequency of the MIPI signal according to a specific ratio. For example, the specific ratio may be ¼ or ¹⁄₁₂.

In a possible implementation 1, when the terminal device opens a camera to perform photographing during a call, a detected communication state is a B8 frequency band under the LTE communication standard. The usage state of the signal line corresponding to the functional module is a MIPI signal line of a camera module, where a frequency of the IMPI signal line is 760 MHz and a drive current thereof is a 1 mA. The terminal device down-regulates (reduces, for example, to 0.5 mA) the drive current of the MIPI signal line of the camera. In this way, the drive current of the MIPI signal line of the camera module is reduced, to reduce interference of the MIPI signal of the camera module to the radio frequency signal of the terminal device, optimize receiving sensitivity of the radio frequency signal, avoid downlink rate reduction, and reduce abnormal cases such as call interruption, thereby optimizing user experience.

In a possible implementation 2, when the terminal device opens a camera to perform photographing during a call, a detected communication state is an N78 frequency band under the NR communication standard. The usage state of the signal line corresponding to the functional module is a MIPI signal line of a camera module, where a drive current thereof is a 1 mA. The terminal device up-regulates (increases, for example, to 1.5 mA) the drive current of the MIPI signal of the camera. In this way, a drive current of a MIPI signal line of the camera module is increased, to enhance interference immunity performance of the MIPI signal line of the camera module, thereby reducing display problems caused by image transmission distortion.

In a possible implementation 3, when the terminal device turns on a display screen during a call, a detected communication state is channels 128-190 of an 850 frequency band under the GSM communication standard. The usage state of the signal line corresponding to the functional module is a MIPI signal line of a display module, where a frequency of the IMPI signal line is 500 MHZ and a drive current thereof is a 1.5 mA. The drive current of the MIPI signal line of the display module is down-regulated (reduced, for example, to 0.5 mA). In this way, the drive current of the MIPI signal of the display module is reduced, to reduce interference of the MIPI signal of the display module to the radio frequency signal of the terminal device, optimize receiving sensitivity of the radio frequency signal, reduce a downlink rate reduction, and reduce abnormal phenomena such as call interruption, thereby improving user experience.

In a possible implementation 4, when the terminal device turns on a display screen during a call, a detected communication state is middle and high channels (channels 190-251) of an 850 frequency band under the GSM communication standard. The usage state of the signal line corresponding to the functional module is a MIPI signal line of a display module, where a drive current thereof is a 1 mA. The drive current of the MIPI signal of the display screen is up-regulated (increased, for example, to 1.5 mA). In this way, a drive current of a MIPI signal of the display module is increased, to enhance interference immunity performance of the MIPI signal of the display module, thereby reducing display problems, such as displaying of blurry screens and freezing of display, when the display screen is turned on, thereby improving user experience.

In conclusion, in this embodiment of this application, a drive current of a signal line corresponding to a functional module is regulated according to communication state, thereby optimizing the interference immunity and interference performance.

Figure 11:
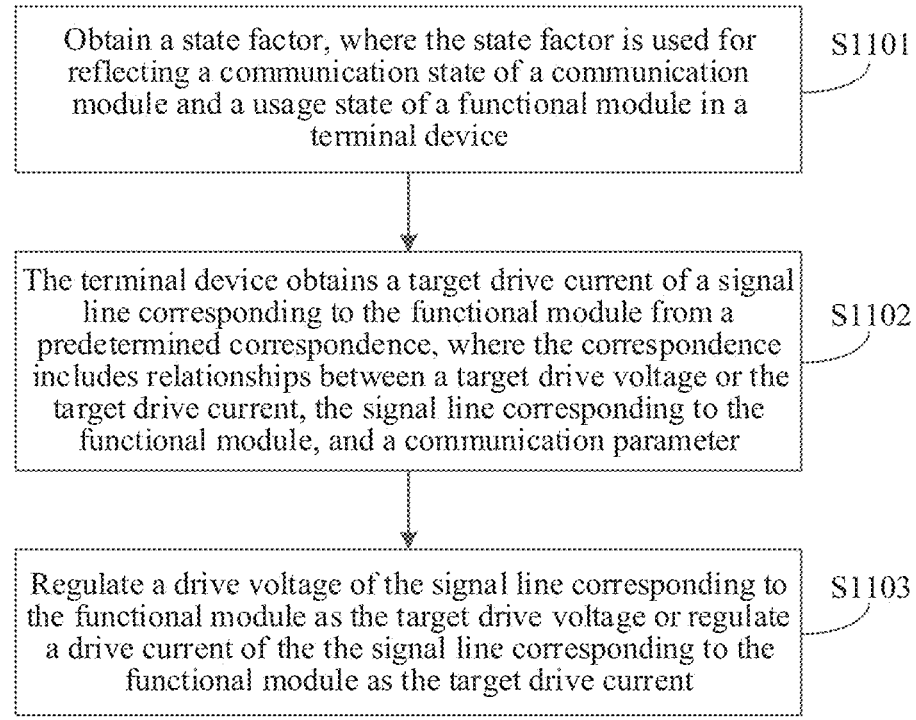
FIG. 11 is a schematic flowchart of a signal processing method according to an embodiment of this application.

FIG. 11 is a schematic flowchart of a signal processing method according to an embodiment of this application. As shown in FIG. 11, the signal processing method includes the following steps.

S1101: A terminal device obtains a state factor, where the state factor is used for reflecting a communication state of the terminal device and a usage state of a functional module in the terminal device.

In this embodiment of this application, for the state factor, the communication state, and the usage state of the functional module, refer to foregoing related descriptions. Details are not described herein again.

S1102: The terminal device obtains a target drive current of a signal line corresponding to the functional module from a predetermined correspondence. The correspondence includes relationships between the target drive voltage or the target drive current, the signal line corresponding to the functional module, and the communication parameter.

In this embodiment of this application, the predetermined correspondence can be obtained through regulation according to a plurality of experiments.

In this embodiment of this application, the correspondence is that the source drive current is greater than the target drive current when a frequency division frequency or frequency multiplication frequency of a signal transmitted on the signal line corresponding to the functional module falls within the working frequency range of the communication module. When the frequency range corresponding to the communication parameter includes a susceptible frequency corresponding to a target interface, the source drive current is less than the target drive current. The susceptible frequency is a frequency of which a voltage amplitude coupled to the signal line corresponding to the functional module is greater than a threshold. The threshold may be any value, and the threshold is not limited in this embodiment of this application.

Using a MIPI signal line as an example, the correspondence is reducing a drive current of the MIPI signal when the frequency or frequency multiplication frequency of the MIPI signal falls within a frequency range corresponding to a communication standard, a frequency band, and/or a channel number. When a coupling of a radio frequency signal corresponding to the communication standard, the frequency band, and/or the channel number of the terminal device to the MIPI signal line is relatively large, a drive current of the MIPI signal is increased.

In a possible implementation 1, when the terminal device opens a camera to perform photographing during a call, a detected communication state is LTE and B8. The usage state of the functional module is a MIPI signal line of a camera, where a frequency of the IMPI signal line is 760 MHz and a drive voltage thereof is a 290 mV or a drive current thereof is 1 mA. According to the predetermined correspondence, the drive voltage or drive current of the MIPI signal of the camera is down-regulated (for example, the drive voltage is regulated to 150) mV or the drive current is regulated to 0.5 mA).

In this way, the drive voltage or drive current of the MIPI signal line of the camera is reduced, to reduce interference of the MIPI signal of the camera to the radio frequency signal of the terminal device, optimize receiving sensitivity of the radio frequency signal, and avoid downlink rate reduction, thereby improving user experience.

In a possible implementation 2, when the terminal device opens a camera to perform photographing during a call, a detected communication state is NR and N78. The usage state of the functional module is a MIPI signal line of a camera, where a drive voltage thereof is a 290 mV or a drive current thereof is 1.5 mA. According to the predetermined correspondence, the drive voltage or drive current of the MIPI signal line of the camera is up-regulated (for example, the drive voltage is regulated to 320 mV or the drive current is regulated to 1.5 mA).

In this way, a drive voltage or drive current of a MIPI signal line of the camera is increased, to enhance interference immunity performance of the MIPI signal of the camera, thereby reducing display problems caused by image transmission distortion.

In a possible implementation 3, when the terminal device turns on a display screen during a call, a detected communication state is channels 128-190 of an 850 frequency band under the GSM communication standard. The usage state of the functional module is a MIPI signal line of a display screen, where a frequency of the IMPI signal line is 500 MHZ and a drive voltage thereof is a 290 mV or a drive current thereof is 1 mA. According to the predetermined correspondence, the drive voltage or drive current of the MIPI signal of the display screen is down-regulated (for example, the drive voltage is regulated to 150 mV or the drive current is regulated to 0.5 mA).

In this way, the drive voltage or drive current of the MIPI signal line of the display screen is reduced, to reduce interference of the MIPI signal of the display screen to the radio frequency signal of the terminal device, optimize receiving sensitivity of the radio frequency signal, avoid downlink rate reduction, and avoid call interruption, thereby improving user experience.

In a possible implementation 4, when the terminal device turns on a display screen during a call, a detected communication state is middle and high channels (channels 190-251) of an 850 frequency band under the GSM communication standard. The usage state of the functional module is a MIPI signal line of a display screen, where a drive voltage thereof is a 290 mV or a drive current thereof is 1 mA. According to the predetermined correspondence, the drive voltage or drive current of the MIPI signal of the display screen is up-regulated (for example, the drive voltage is regulated to 320 mV or the drive current is regulated to 1.5 mA).

In this way, a drive voltage or drive current of a MIPI signal line of the display screen is increased, to enhance interference immunity performance of the MIPI signal of the display screen, thereby avoiding display problems, such as displaying of blurry screens and freezing of display, when the display screen is turned on, thereby improving user experience.

An uplink frequency range corresponding to the GSM 850 frequency band is 824 to 849 MHZ, and a downlink frequency range corresponding thereto is 869 to 894 MHZ.

In a possible implementation, the correspondence may be represented by a state netlist. The detected state factor is compared with a provided state netlist, to obtain a target drive voltage or target drive current S1103: The terminal device regulates a drive voltage of the signal line corresponding to the functional module as the target drive voltage or regulates a drive current of the signal line corresponding to the functional module as the target drive current.

In conclusion, in this embodiment of this application, a drive voltage or drive current of a signal line corresponding to a functional module is regulated according to communication state, thereby optimizing the interference immunity and interference performance.

Figure 12:
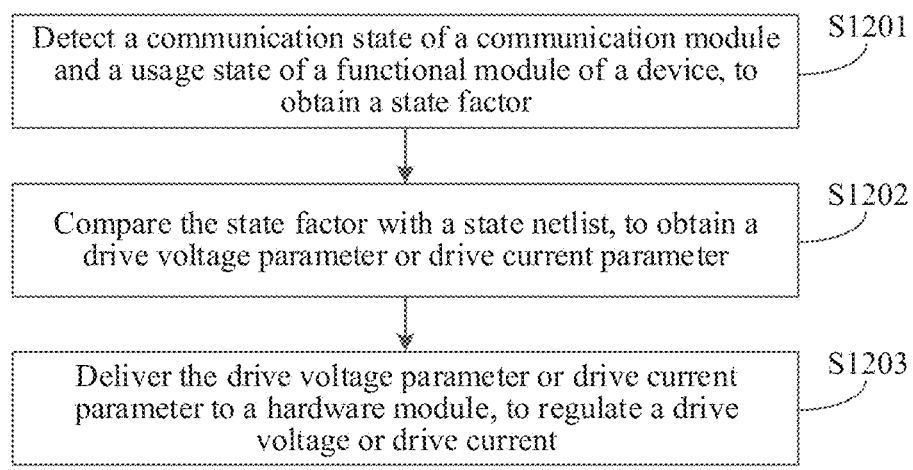
FIG. 12 is a schematic flowchart of a signal processing method according to an embodiment of this application.

Based on the foregoing embodiment, the correspondence may be represented by a state netlist. For example, FIG. 12 is a schematic flowchart of a signal processing method according to an embodiment of this application. An example in which a signal is a MIPI signal is used.

S1201: Detect a communication state of a communication module and a usage state of a functional module of a device, to obtain a state factor.

Specifically, a processor detects a communication state and a usage state of a functional module of a terminal device, to obtain a state factor.

In this embodiment of this application, the communication state is used for indicating a communication situation of the terminal device. The communication situation may be represented by the following parameters: a standard of a currently registered network, a current frequency band for communication with a base station, a current channel for communication, a current power for communication, and the like.

In this embodiment of this application, the functional module is configured to implement various functions of the terminal device. The various functions, include, but are not limited to, display, photographing, storage, audio playback, and the like. The functional module includes, but is not limited to, a display module, a camera module, an audio module, and the like. In this embodiment of this application, the communication state is used for indicating a situation of current communication. In different use scenarios, the modules (or components) interact with each other differently, usage states of signal lines are different, and frequencies of corresponding signals are different. For example, a video call includes interaction between a processor and a camera, interaction between the processor and a communication module, interaction between the processor and a display screen, and the like. A voice call does not include interaction between a processor and a camera. It may be understood that, a frequency of a MIPI signal between the processor and the display screen in the terminal device is different from a frequency of a MIPI signal between the processor and the camera.

In this embodiment of this application, a state factor includes one or more of the following parameters: a communication standard, a frequency band, a channel number, a frequency of a MIPI signal, a frequency of an IIC signal, a frequency of a VBO signal, a frequency of an LVDS signal, or the like.

S1202: Compare the state factor with a state netlist, to obtain a drive voltage parameter or drive current parameter.

Specifically, the processor compares the state factor with a state netlist, to obtain a drive voltage parameter or drive current parameter. In this way, the terminal device obtains a drive voltage parameter or drive current parameter by using a state netlist, which is easy to operate.

In this embodiment of this application, the state netlist includes one or more of the following parameters: a communication standard, a frequency band, a channel number, a frequency of a MIPI signal, a drive voltage and a drive current of the MIPI signal, or the like.

In a possible implementation 1, the state netlist includes: a communication standard, a frequency band, a frequency of a MIPI signal, and a drive voltage of the MIPI signal. For example, Table 2 is a state netlist corresponding to a MIPI signal line of a camera according to this embodiment of this application.

TABLE 2

State netlist corresponding to a MIPI signal line of a camera

| Communication standard | Frequency band | Frequency of MIPI signal | Drive voltage of MIPI signal |
|---|---|---|---|
| LTE | B8 | 760 MHz | 150 mV |
| NR | N78 | 760 MHz | 320 mV |
| Remaining state | | 760 MHz | Default value (290 mV) |

As shown in Table 2, using an example in which a frequency of a MIPI signal is 760 MHz, when a communication standard of the terminal device is LTE, and a frequency band thereof is B8, a drive voltage of the MIPI signal is 150 mV, and a drive voltage parameter obtained by the processor is 150 mV.

When a communication standard of the terminal device is NR, and a frequency band thereof is N78, a drive voltage of the MIPI signal is 320 mV, and a drive voltage parameter obtained by the processor is 320 mV.

When the terminal device is in the remaining states, a drive voltage of the MIPI signal is 290 mV, and a drive voltage parameter obtained by the processor is 290 mV. The remaining states include three cases: The first case is that the communication standard of the terminal device is a communication standard (for example, GSM or WCDMA) other than LTE and NR. The second case is that the communication standard of the terminal device is LTE, but the frequency band is not B8. The third case is that the communication standard of the terminal device is NR, but the frequency band is not N78.

In a possible implementation 2, the state netlist includes: a communication standard, a frequency band, a frequency of a MIPI signal, and a drive current of the MIPI signal. For example, Table 3 is a state netlist corresponding to a MIPI signal line of a camera according to this embodiment of this application. Table 3 State netlist corresponding to a MIPI signal line of a camera

TABLE 3

| Communication standard | Frequency band | Frequency of MIPI signal | Drive current of MIPI signal |
|---|---|---|---|
| LTE | B8 | 760 MHz | 0.5 mA |
| NR | N78 | 760 MHz | 1.5 mA |
| Remaining state | | 760 MHz | Default value (1 mA) |

As shown in Table 3, using an example in which a frequency of a MIPI signal is 760 MHz, when a communication standard is LTE, and a frequency band thereof is B8, a drive current of the MIPI signal is 0.5 mA, and a drive current parameter obtained by the processor is 0.5 mA.

When a communication standard of the terminal device is NR, a frequency band thereof is N78, and a frequency of the MIPI signal is 760 MHZ, a drive current of the MIPI signal is 1.5 mA, and a drive current parameter obtained by the processor is 1.5 mA.

When the terminal device is in the remaining states, a drive current of the MIPI signal is 1 mA, and a drive voltage parameter obtained by the processor is 1 mA. The remaining states include three cases: The first case is that the communication standard of the terminal device is a communication standard (for example, GSM or WCDMA) other than LTE and NR. The second case is that the communication standard of the terminal device is LTE, but the frequency band is not B8. The third case is that the communication standard of the terminal device is NR, but the frequency band is not N78.

In a possible implementation 3, the state netlist includes: a communication standard, a frequency band, a channel number, a frequency of a MIPI signal, and a drive voltage of the MIPI signal. For example, Table 4 is a state netlist corresponding to a MIPI signal line of a display screen according to this embodiment of this application.

TABLE 4

State netlist corresponding to a MIPI signal line of a display screen

| Communication standard | Frequency band | Channel number | Frequency of MIPI signal | Drive voltage of MIPI signal |
|---|---|---|---|---|
| GSM | 850 | 128-190 | 500 MHz | 150 mV |
| GSM | 850 | 191-251 | 500 MHz | 320 mV |
| Remaining state | | | 500 MHz | Default value (290 mV) |

As shown in Table 4, using an example in which a frequency of a MIPI signal is 500 MHz, when a communication standard of the terminal device is GSM, a frequency band thereof is 850, and a channel number thereof is 128-190, a drive voltage of the MIPI signal is 150 mV, and a drive voltage parameter obtained by the processor is 150 mV.

When a communication standard of the terminal device is GSM, and a frequency band thereof is 850, and a channel number thereof is 191-251, a drive voltage of the MIPI signal is 320 mV, and a drive voltage parameter obtained by the processor is 320 mV.

When the terminal device is in the remaining states, a drive voltage of the MIPI signal is 290 mV, and a drive voltage parameter obtained by the processor is 290 mV. The remaining states include two cases: The first case is that the communication standard of the terminal device is a communication standard (for example, LTE, WCDMA, or NR) other than GSM. The second case is that the communication standard of the terminal device is GSM, but the frequency band is not 850 (for example, the frequency band is 900, 1800, or the like).

In a possible implementation 4, the state netlist includes: a communication standard, a frequency band, a channel number, a frequency of a MIPI signal, and a drive current of the MIPI signal. For example, Table 5 is a state netlist corresponding to a MIPI signal line of a display screen according to this embodiment of this application.

TABLE 5

State netlist corresponding to a MIPI signal line of a display screen

| Communication standard | Frequency band | Channel number | Frequency of MIPI signal | Drive voltage of MIPI signal |
|---|---|---|---|---|
| GSM | 850 | 128-190 | 500 MHz | 0.5 mA |
| GSM | 850 | 191-251 | 500 MHz | 1.5 mA |
| Remaining state | | | 500 MHz | Default value (1 mA) |

As shown in Table 5, using an example in which a frequency of a MIPI signal is 500 MHz, when a communication standard of the terminal device is GSM, a frequency band thereof is 850, and a channel number thereof is 128-190, a drive current of the MIPI signal is 0.5 mA, and a drive current parameter obtained by the processor is 0.5 mA.

When a communication standard of the terminal device is GSM, and a frequency band thereof is 850, and a channel number thereof is 191-251, a drive current of the MIPI signal is 1.5 mA, and a drive current parameter obtained by the processor is 1.5 mA.

When the terminal device is in the remaining states, a drive current of the MIPI signal is 1 mA, and a drive current parameter obtained by the processor is 1 mA. The remaining states include two cases: The first case is that the communication standard of the terminal device is a communication standard (for example, GSM or WCDMA) other than GSM. The second case is that the communication standard of the terminal device is GSM, but the frequency band is not 850 (for example, the frequency band is 900, 1800, or the like).

S1203: Deliver the drive voltage parameter or drive current parameter to a hardware module, to regulate a drive voltage or drive current.

Specifically, the processor delivers the drive voltage parameter or drive current parameter to a hardware module, to regulate a drive voltage or drive current.

The signal processing method shown in FIG. 9 to FIG. 12 may also be applied to regulation of a signal such as an IIC signal, a VBO signal, or an LVDS signal.

For example, using an example in which a target signal line is an IIC signal line, and a drive voltage of an IIC signal is usually is 1.8 V, when a frequency division frequency or frequency multiplication frequency of the IIC signal falls within a current communication range, the drive voltage of the IIC signal may be up-regulated to 2 V according to a correspondence. The drive voltage of the IIC signal may be down-regulated to 1.6 V according to the correspondence when a voltage amplitude of an electromagnetic wave component that is of an electromagnetic wave radiated by the communication module working in the working frequency range and at the transmit parameter and that is coupled to the signal line corresponding to the functional module is greater than a threshold.

The signal processing method for regulating interference and interference immunity in a terminal device in the embodiments of this application has been described above. A related apparatus for performing the signal processing method provided in the embodiments of this application is described below. It may be understood by a person skilled in the art that the method and the apparatus can be combined with or refer to each other. The related apparatus provided in this embodiment of this application can perform the steps of the foregoing signal processing method.

Figure 13:
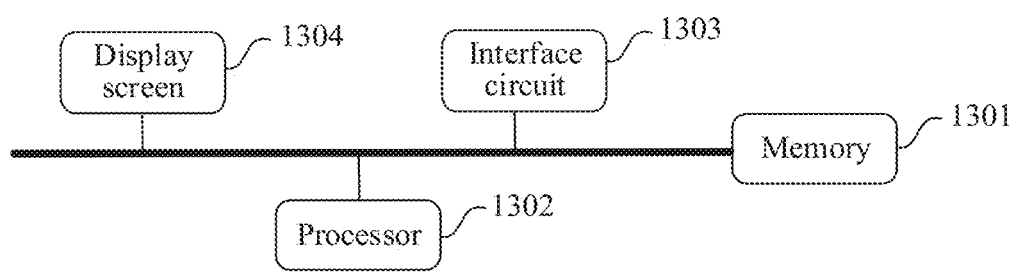
FIG. 13 is a schematic diagram of a hardware structure of a related apparatus for signal processing according to an embodiment of this application.

FIG. 13 is a schematic diagram of a hardware structure of a related apparatus for signal processing according to an embodiment of this application. Referring to FIG. 13, the apparatus includes a memory 1301, a processor 1302, and an interface circuit 1303. The apparatus may further include a display screen 1304. The memory 1301, the processor 1302, the interface circuit 1303, and the display screen 1304 may perform communication. For example, the memory 1301, the processor 1302, the interface circuit 1303, and the display screen 1304 may perform communication through a communication bus. The memory 1301 is configured to store computer-executable instructions, executed by the processor 1302. In addition, the interface circuit 1303 performs communication, to implement the signal processing method provided in the following embodiments of this application.

In a possible implementation, the computer-executable instructions in the embodiments of this application may also be referred to as application code. This is not specifically limited in the embodiments of this application.

Optionally, the interface circuit 1303 may further include a transmitter and/or a receiver. Optionally, the processor 1302 may include one or more CPUs, and may also be another general-purpose processor, a digital signal processor (DSP), an application-specific inter-integrated circuit (ASIC), or the like. The general-purpose processor may be a microprocessor, or the processor may be any conventional processor and the like. Steps of the methods disclosed with reference to this application may be directly performed and completed by a hardware processor, or may be performed and completed by using a combination of hardware and a software module in the processor.

The embodiments of this application further provide a computer-readable storage medium. The method described in the foregoing embodiments may be fully or partially implemented by software, hardware, firmware, or any combination thereof. If implemented in software, the functions may be stored in or transmitted over a computer-readable medium as one or more instructions or code. The computer-readable medium may include a computer storage medium and a communication medium, and may also include any medium that enables a computer program to be transmitted from one place to another. The storage medium may be any target medium accessible to a computer.

In a possible implementation, the computer-readable medium may include a RAM, a ROM, a compact disc read-only memory (CD-ROM) or other disc storage, a disk storage medium or other disk storage, or any other medium that aims to carry or store required program code in a form of an instruction or a data structure and that is accessible by a computer. In addition, any connection is properly referred to as a computer-readable medium. For example, if software is transmitted from a website, a server or another remote source by using a coaxial cable, an optical fiber cable, a twisted pair, a digital subscriber line (DSL) or wireless technologies such as infrared ray, radio and microwave, the coaxial cable, optical fiber cable, twisted pair, DSL or wireless technologies such as infrared ray, radio and microwave are included in fixation of a medium to which they belong. For example, a disk and a disc used by this application include a compact disc, a laser disc, an optical disc, a digital versatile disc (DVD), a floppy disk, and a Blu-ray disc. The disk generally magnetically reproduces data, and the disc optically reproduces data by using laser. The foregoing combination should also be included in the scope of the computer-readable medium.

The embodiments of this application is described with reference to the flowcharts and/or block diagrams of the method, the device (system), and the computer program product according to the embodiments of this application. It may be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a dedicated computer, an embedded processor, or a processing unit of any other programmable data processing device to generate a machine, so that the instructions executed by a computer or a processing unit of any other programmable data processing device generate an apparatus for implementing a specific function in one or more processes in the flowcharts and/or in one or more blocks in the block diagrams.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, or improvement made within the spirit and principle of this application shall fall within the protection scope of this application.

What is claimed is:

1. A signal processing method for regulating interference and interference immunity in a terminal device, the method comprising:

obtaining, by the terminal device, a state factor, wherein the state factor is used for reflecting a communication state of a communication component and a usage state of a functional component in the terminal device, wherein the state factor comprises a communication parameter of the communication component and a source drive voltage or source drive current of a signal line corresponding to the functional component, and the communication parameter comprises a working frequency range and a transmit parameter of the communication component;

down-regulating, by the terminal device, the source drive voltage of the signal line corresponding to the functional component, or down-regulating, by the terminal device, the source drive current of the signal line corresponding to the functional component based on a frequency division frequency or frequency multiplication frequency of a signal transmitted on the signal line corresponding to the functional component falling within the working frequency range of the communication component, to reduce interference of the functional component to the communication component; and up-regulating, by the terminal device, the source drive voltage of the signal line corresponding to the functional component, or up-regulating, by the terminal device, the source drive current of the signal line corresponding to the functional component based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component;

wherein the functional component comprises a camera component and a display component;

wherein based on a frequency of a mobile industry processor interface (MIPI) signal line of the camera component being 760 MHZ, a communication standard of the communication component is Long Term Evolution (LTE), and a frequency band of the communication component is B8, and wherein the terminal device down-regulates a source drive voltage of the MIPI signal line of the camera component to 150 mV, or the terminal device down-regulates a source drive current of the MIPI signal line of the camera component to 0.5 mA, to reduce interference of the camera component to the communication component;

wherein based on the communication standard of the communication component being New Radio (NR), a frequency band of the communication component is N78, and wherein based on the MIPI signal line of the camera component transmitting a signal, the terminal device up-regulates the source drive voltage of the MIPI signal line of the camera component to 320 mV, or the terminal device up-regulates the source drive current of the MIPI signal line of the camera component to 1.5 mA, to increase interference immunity of the camera component against the communication component;

wherein based on the frequency of the MIPI signal line of the display component being 500 MHz, the communication standard of the communication component is Global System for Mobile Communications (GSM), the frequency band of the communication component is 850, and a channel number of the communication component ranges from 128 to 190, and wherein the terminal device down-regulates the source drive voltage of the MIPI signal line of the display component to 150 mV, or the terminal device down-regulates the source drive current of the MIPI signal line of the display component to 0.5 mA, to reduce interference of the display component to the communication component; and wherein based on the communication standard of the communication component being GSM, the frequency band of the communication component is 850 and the channel number of the communication component ranges from 191 to 251, and wherein based on the MIPI signal line of the display component transmitting a signal, the terminal device up-regulates the source drive voltage of the MIPI signal line of the display component to 320 mV, or the terminal device up-regulates the source drive current of the MIPI signal line of the display component to 1.5 mA, to increase the interference immunity of the display component against the communication component.

2. The method according to claim 1, wherein the signal line corresponding to the functional component comprises one or more of the following: the MIPI signal line, an inter-integrated circuit (IIC) signal line, a V-by-One (VBO) signal line, or a low-voltage differential signaling (LVDS) signal line.

3. The method according to claim 1,
wherein the working frequency range of the communication component comprises one or more of the following: a communication standard, a frequency band, or a channel number; and
wherein the transmit parameter comprises parameters of an antenna state and a transmit power adopted by the terminal device during communication.

4. The method according to claim 1, further comprising:
obtaining, by the terminal device, a target drive voltage or a target drive current of the signal line corresponding to the functional component from a predetermined correspondence, wherein the predetermined correspondence comprises relationships between the target drive voltage or the target drive current, the signal line corresponding to the functional component, and the communication parameter;
down-regulating, by the terminal device, the source drive voltage of the signal line corresponding to the functional component to the target drive voltage, or down-regulating, by the terminal device, the source drive current of the signal line corresponding to the functional component to the target drive current based on the frequency division frequency or frequency multiplication frequency of the signal transmitted on the signal line corresponding to the functional component falling within the working frequency range of the communication component, to reduce interference of the functional component to the communication component; and
up-regulating, by the terminal device, the source drive voltage of the signal line corresponding to the functional component to the target drive voltage, or up-regulating, by the terminal device, the source drive current of the signal line corresponding to the functional component to the target drive current based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component.

5. The method according to claim 4, wherein the predetermined correspondence is comprised in a state netlist, and the obtaining, by the terminal device, the target drive voltage or the target drive current of the signal line corresponding to the functional component from the predetermined correspondence comprises:
obtaining, by the terminal device, the target drive voltage or the target drive current of the signal line corresponding to the functional component from the state netlist.

6. A terminal device, comprising:
a communication component; and
a functional component,
wherein the terminal device obtains a state factor, wherein the state factor is used for reflecting a communication state of the communication component and a usage state of the functional component in the terminal device, wherein the state factor comprises a communication parameter of the communication component and a source drive voltage or source drive current of a signal line corresponding to the functional component, and the communication parameter comprises a working frequency range and a transmit parameter of the communication component;
wherein the terminal device down-regulates the source drive voltage of the signal line corresponding to the functional component, or the terminal device down-regulates the source drive current of the signal line corresponding to the functional component based on a frequency division frequency or frequency multiplication frequency of a signal transmitted on the signal line corresponding to the functional component falling within the working frequency range of the communication component, to reduce interference of the functional component to the communication component; and
wherein the terminal device up-regulates the source drive voltage of the signal line corresponding to the functional component, or the terminal device up-regulates the source drive current of the signal line corresponding to the functional component based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component;
wherein the functional component comprises a camera component and a display component;
wherein based on a frequency of a mobile industry processor interface (MIPI) signal line of the camera component being 760 MHZ, a communication standard of the communication component is Long Term Evolution (LTE), and a frequency band of the communication component is B8, and wherein the terminal device down-regulates a source drive voltage of the MIPI signal line of the camera component to 150 mV, or the terminal device down-regulates a source drive current of the MIPI signal line of the camera component to 0.5 mA, to reduce interference of the camera component to the communication component;

wherein based on the communication standard of the communication component being New Radio (NR), a frequency band of the communication component is N78, and wherein based on the MIPI signal line of the camera component transmitting a signal, the terminal device up-regulates the source drive voltage of the MIPI signal line of the camera component to 320 mV, or the terminal device up-regulates the source drive current of the MIPI signal line of the camera component to 1.5 mA, to increase interference immunity of the camera component against the communication component;

wherein based on the frequency of the MIPI signal line of the display component being 500 MHz, the communication standard of the communication component is Global System for Mobile Communications (GSM), the frequency band of the communication component is 850, and a channel number of the communication component ranges from 128 to 190, and wherein the terminal device down-regulates the source drive voltage of the MIPI signal line of the display component to 150 mV, or the terminal device down-regulates the source drive current of the MIPI signal line of the display component to 0.5 mA, to reduce interference of the display component to the communication component; and wherein based on the communication standard of the communication component being GSM, the frequency band of the communication component is 850 and the channel number of the communication component ranges from 191 to 251, and wherein based on the MIPI signal line of the display component transmitting a signal, the terminal device up-regulates the source drive voltage of the MIPI signal line of the display component to 320 mV, or the terminal device up-regulates the source drive current of the MIPI signal line of the display component to 1.5 mA, to increase the interference immunity of the display component against the communication component.

7. The terminal device according to claim 6,
wherein the terminal device obtains a target drive voltage or a target drive current of the signal line corresponding to the functional component from a predetermined correspondence,
wherein the predetermined correspondence comprises relationships between the target drive voltage or the target drive current, the signal line corresponding to the functional component, and the communication parameter;
wherein the terminal device down-regulates the source drive voltage of the signal line corresponding to the functional component to the target drive voltage, or the terminal device down-regulates the source drive current of the signal line corresponding to the functional component to the target drive current based on the frequency division frequency or frequency multiplication frequency of the signal transmitted on the signal line corresponding to the functional component falling within the working frequency range of the communication component, to reduce interference of the functional component to the communication component; and
wherein the terminal device up-regulates the source drive voltage of the signal line corresponding to the functional component to the target drive voltage, or the terminal device up-regulates the source drive current of the signal line corresponding to the functional component to the target drive current based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component.

8. The terminal device according to claim 7,
wherein the predetermined correspondence is comprised in a state netlist, and the terminal device obtains the target drive voltage or the target drive current of the signal line corresponding to the functional component from the state netlist.

9. A non-transitory computer-readable storage medium storing computer program instructions that, when executed, implement a method that includes:
obtaining, by a terminal device, a state factor, wherein the state factor is used for reflecting a communication state of a communication component and a usage state of a functional component in the terminal device, wherein the state factor comprises a communication parameter of the communication component and a source drive voltage or source drive current of a signal line corresponding to the functional component, and the communication parameter comprises a working frequency range and a transmit parameter of the communication component;
down-regulating, by the terminal device, the source drive voltage of the signal line corresponding to the functional component, or down-regulating, by the terminal device, the source drive current of the signal line corresponding to the functional component based on a frequency division frequency or frequency multiplication frequency of a signal transmitted on the signal line corresponding to the functional component falling within the working frequency range of the communication component, to reduce interference of the functional component to the communication component; and
up-regulating, by the terminal device, the source drive voltage of the signal line corresponding to the functional component, or up-regulating, by the terminal device, the source drive current of the signal line corresponding to the functional component based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component;
wherein the functional component comprises a camera component and a display component;
wherein based on a frequency of a mobile industry processor interface (MIPI) signal line of the camera component being 760 MHZ, a communication standard of the communication component is Long Term Evolution (LTE), and a frequency band of the communication component is B8, and wherein the terminal device down-regulates a source drive voltage of the MIPI signal line of the camera component to 150 mV, or the terminal device down-regulates a source drive current of the MIPI signal line of the camera component to 0.5 mA, to reduce interference of the camera component to the communication component;

wherein based on the communication standard of the communication component being New Radio (NR), a frequency band of the communication component is N78, and wherein based on the MIPI signal line of the camera component transmitting a signal, the terminal device up-regulates the source drive voltage of the MIPI signal line of the camera component to 320 mV, or the terminal device up-regulates the source drive current of the MIPI signal line of the camera component to 1.5 mA, to increase interference immunity of the camera component against the communication component;

wherein based on the frequency of the MIPI signal line of the display component being 500 MHz, the communication standard of the communication component is Global System for Mobile Communications (GSM), the frequency band of the communication component is 850, and a channel number of the communication component ranges from 128 to 190, and wherein the terminal device down-regulates the source drive voltage of the MIPI signal line of the display component to 150 mV, or the terminal device down-regulates the source drive current of the MIPI signal line of the display component to 0.5 mA, to reduce interference of the display component to the communication component; and wherein based on the communication standard of the communication component being GSM, the frequency band of the communication component is 850 and the channel number of the communication component ranges from 191 to 251, and wherein based on the MIPI signal line of the display component transmitting a signal, the terminal device up-regulates the source drive voltage of the MIPI signal line of the display component to 320 mV, or the terminal device up-regulates the source drive current of the MIPI signal line of the display component to 1.5 mA, to increase the interference immunity of the display component against the communication component.

10. The computer-readable storage medium according to claim 9, wherein the signal line corresponding to the functional component comprises one or more of the following: the MIPI signal line, an inter-integrated circuit (IIC) signal line, a V-by-One (VBO) signal line, or a low-voltage differential signaling (LVDS) signal line.

11. The computer-readable storage medium according to claim 9,
wherein the working frequency range of the communication component comprises one or more of the following: a communication standard, a frequency band, or a channel number; and
wherein the transmit parameter comprises parameters of an antenna state and a transmit power adopted by the terminal device during communication.

12. The computer-readable storage medium according to claim 9, wherein the computer program instructions, when executed, further implement the method that includes:
obtaining, by the terminal device, a target drive voltage or a target drive current of the signal line corresponding to the functional component from a predetermined correspondence, wherein the predetermined correspondence comprises relationships between the target drive voltage or the target drive current, the signal line corresponding to the functional component, and the communication parameter;
down-regulating, by the terminal device, the source drive voltage of the signal line corresponding to the functional component to the target drive voltage, or down-regulating, by the terminal device, the source drive current of the signal line corresponding to the functional component to the target drive current based on the frequency division frequency or frequency multiplication frequency of the signal transmitted on the signal line corresponding to the functional component falling within the working frequency range of the communication component, to reduce interference of the functional component to the communication component; and
up-regulating, by the terminal device, the source drive voltage of the signal line corresponding to the functional component to the target drive voltage, or up-regulating, by the terminal device, the source drive current of the signal line corresponding to the functional component to the target drive current based on a voltage amplitude of an electromagnetic wave component that is of an electromagnetic wave radiated by the communication component working in the working frequency range and at the transmit parameter and that is coupled to the signal line corresponding to the functional component being greater than a threshold, to increase interference immunity of the functional component against the communication component.

13. The computer-readable storage medium according to claim 12, wherein the predetermined correspondence is comprised in a state netlist, and the obtaining, by the terminal device, the target drive voltage or the target drive current of the signal line corresponding to the functional component from the predetermined correspondence comprises:
obtaining, by the terminal device, the target drive voltage or the target drive current of the signal line corresponding to the functional component from the state netlist.

* * * * *